Jan. 11, 1966 D. C. GRIFFIN ETAL 3,228,509

PNEUMATICALLY OPERATED DATA PROCESSING SYSTEM

Original Filed Aug. 29, 1961 11 Sheets-Sheet 1

INVENTORS
DESMOND C. GRIFFIN
CLARENCE M. BLYTHE
GERALD T. HAMMOND
MICHAEL POPOVICH

Thomas S. Ross

BY Albert W. Scribner

ATTORNEYS

PNEUMATICALLY OPERATED DATA PROCESSING SYSTEM

Original Filed Aug. 29, 1961 11 Sheets-Sheet 2

INVENTORS
DESMOND C. GRIFFIN
CLARENCE M. BLYTHE
GERALD T. HAMMOND
MICHAEL POPOVICH
BY Thomas S. Ross
Albert W. Scribner
ATTORNEYS

PNEUMATICALLY OPERATED DATA PROCESSING SYSTEM

Original Filed Aug. 29, 1961 11 Sheets-Sheet 3

INVENTORS
DESMOND C. GRIFFIN
CLARENCE M. BLYTHE
GERALD T. HAMMOND
MICHAEL POPOVICH
BY Thomas S. Ross
Albert W. Scribner
ATTORNEYS Jan. 11, 1966 D. C. GRIFFIN ETAL 3,228,509

PNEUMATICALLY OPERATED DATA PROCESSING SYSTEM

Original Filed Aug. 29, 1961 11 Sheets-Sheet 4

INVENTORS
DESMOND C. GRIFFIN
CLARENCE M. BLYTHE
GERALD T. HAMMOND
MICHAEL POPOVICH

BY Thomas S. Ross
Albert W. Scribner
ATTORNEYS

INVENTORS
DESMOND C. GRIFFIN
CLARENCE M. BLYTHE
GERALD T. HAMMOND
MICHAEL POPOVICH
BY Thomas S. Ross
Albert W. Scribner
ATTORNEYS

PNEUMATICALLY OPERATED DATA PROCESSING SYSTEM

Original Filed Aug. 29, 1961 11 Sheets-Sheet 6

INVENTORS
DESMOND C. GRIFFIN
CLARENCE M. BLYTHE
GERALD T. HAMMOND
MICHAEL POPOVICH
BY Thomas S. Ross
Albert W. Scribner
ATTORNEYS INVENTORS
DESMOND C. GRIFFIN
CLARENCE M. BLYTHE
GERALD T. HAMMOND
MICHAEL POPOVICH
BY Thomas S. Ross
Albert W. Scribner
ATTORNEYS

PNEUMATICALLY OPERATED DATA PROCESSING SYSTEM

Original Filed Aug. 29, 1961

INVENTORS
DESMOND C. GRIFFIN
CLARENCE M. BLYTHE
GERALD T. HAMMOND
MICHAEL POPOVICH
BY Thomas S. Ross
Albert W. Scribner
ATTORNEYS

PNEUMATICALLY OPERATED DATA PROCESSING SYSTEM

Original Filed Aug. 29, 1961 11 Sheets-Sheet 9

INVENTORS
DESMOND C. GRIFFIN
CLARENCE M. BLYTHE
GERALD T. HAMMOND
MICHAEL POPOVICH

BY Thomas S. Ross
Albert W. Scribner
ATTORNEYS

INVENTORS
DESMOND C. GRIFFIN
CLARENCE M. BLYTHE
GERALD T. HAMMOND
MICHAEL POPOVICH
BY Thomas S. Ross
Albert W. Scribner
ATTORNEYS

CODE DESIGNATIONS

| CHARACTER | CODE | CHARACTER | CODE | CHARACTER | CODE | CHARACTER | CODE | CHARACTER | CODE | CHARACTER | CODE |
|---|---|---|---|---|---|---|---|---|---|---|---|
| A | A-4 | J | E-4 | S | B-2 | 3 | B-3 | - _ | G-5 | SPACE | H-4 |
| B | D-4 | K | F-2 | T | D-1 | 4 | C-1 | $\frac{1}{2}$ $\frac{1}{4}$ | H-1 | TAB. | I-6 |
| C | C-2 | L | F-6 | U | E-3 | 5 | C-5 | = + | H-3 | CAR. RET. | I-5 |
| D | B-6 | M | E-6 | V | C-6 | 6 | D-3 | ; : | G-4 | B.SPACE | I-1 |
| E | B-5 | N | E-2 | W | B-1 | 7 | E-1 | ' " | H-2 | SHIFT | I-4 |
| F | C-4 | O | F-5 | X | B-4 | 8 | E-5 | , , | F-4 | UNSHIFT | I-2 |
| G | D-2 | P | G-3 | Y | D-5 | 9 | F-3 | . . | G-2 | SELECT | H-5 |
| H | D-6 | Q | A-3 | Z | A-6 | 0 | G-1 | / ? | G-6 | STOP | I-3 |
| I | F-1 | R | C-3 | 2 | A-5 | EJECT | 5-6 | DELETE | 8 | | |
| | | | | | | PUNCH OFF | A-1 | PUNCH ON | A-2 | AUX. STOP | H-6 |

Fig. 14

INVENTORS
DESMOND C. GRIFFIN
CLARENCE M. BLYTHE
GERALD T. HAMMOND
MICHAEL POPOVICH
BY
ATTORNEYS

United States Patent Office 3,228,509

Patented Jan. 11, 1966

3,228,509

PNEUMATICALLY OPERATED DATA PROCESSING SYSTEM

Desmond C. Griffin, Clarence M. Blythe, and Gerald T. Hammond, Hendersonville, and Michael Popovich, Mountain Home, N.C., assignors, by mesne assignments, to Royal Typewriter Company, Inc., New York, N.Y., a corporation of Delaware Continuation of application Ser. No. 134,702, Aug. 29, 1961. This application Mar. 31, 1965, Ser. No. 446,778
5 Claims. (Cl. 197—20)

This is a continuation of application Serial No. 134,702, filed August 29, 1961, now abandoned.

This invention relates to an improved pneumatically operated and controlled data processing system; and more particularly relates to a typewriter, record punch and record reader system having novel pneumatic control circuitry therebetween which affords greater flexibility and wider application in use as compared to conventional types of pneumatic systems.

The known types of pneumatically controlled typewriter units have been pretty much confined to letter writing applications, that is a perforated record is repeatedly read so that identical individually typed letters may be subsequently produced. In these conventional types of record controlled typing systems there is little, if any, flexibility in the pneumatic interconnection between the record punch unit, the record reader unit and the typewriter which will permit an efficient handling and/or programming of given data in a number of different ways.

One object of the instant invention is to provide a novel pneumatically controlled data processing system having a typewriter, a record punch unit and a record reader unit which are pneumatically interconnected in a manner which will allow various combinations of the three units to control or be controlled by the data and/or program information that is perforated in a record card or tape.

Another object of the invention is to provide a novel pneumatic record controlled system which is conditionable so as to be operable in response to predetermined codes in a perforated record to skip over or omit predetermined portions of the data contained in a record that is being read.

Another object of the invention is to provide a novel pneumatic record controlled system that is conditionable so as to be operable in response to predetermined codes in a perforated record and to condition the record punch unit so as to be capable of reproducing selected portions of the record tape.

Another object of the invention is to provide a novel pneumatic record controlled system which is conditionable so as to be operable in response to predetermined codes in a perforated record to stop at a predetermined point during a record reading and typing operation.

Another object of the invention is to provide a novel pneumatic record controlled system having a reader record feed drive means which is conditionable so as to be manually or record controlled to stop or to advance the record being read at any one of three or more different forward speeds.

Another object of the invention is to provide a novel pneumatic record controlled system wherein three separate drive means are provided for advancing the record through the record reader unit at three different speeds and wherein a pneumatic interlock is provided so that no one record drive means may be made operative until the other two have been made inoperative.

Another object of the invention is to provide a novel pneumatic record controlled system wherein provision is made for inserting an additional perforation in the record adjacent the first one of double codes or the like that have previously been perforated so that a momentary interruption in the record feed may occur when, during a subsequent reading operation, the first such code is read; this additional perforation in the record also serving to stop the reading operation during a record reproducing function of the system.

Another object of the invention is to provide a novel pneumatic record controlled system wherein a control means for the record feed drive means of a record reader unit is provided so as to be capable of stopping and immediately thereafter starting said feed drive means in response to a single control pulse.

Another object of the invention is to provide a novel pneumatic record system wherein provision is made for perforating a delete code hole in the next record space after a code error is made and wherein during a subsequent reading operation this code hole is sensed just before the reading of said code error whereby the code error signals are rendered ineffective to control any of the elements of said system.

Another object of the invention is to provide a pneumatic record controlled system wherein the record to be perforated and/or read is in the form of a plurality of individual fanfolded strips of card width tape which may be manually or automatically fed into the system in predetermined sequence and which may be subsequently stored or filed in accordance with any desired classification of the data thereon.

Another object of the invention is to provide a novel pneumatic record controlled system wherein during a reproducing operation where a type record and a new perforated record is being made, the pneumatic control circuitry may be conditioned so as to disable the reader record feed drive and the record perforator so that the reader record tape may be manually advanced whereby only the typewriter is temporarily operatively controlled and operated by the record.

Another object of the invention is to provide a novel pneumatic record control system having an interconnected typewriter, reader and punch and wherein the record feed device for the punch unit is automatically operated a predetermined number of times in response to the initiation of certain typewriter functions such as carriage return, tab, back space, etc.

Another object of the invention is to provide a novel pneumatic record controlled system wherein a high speed forward record feed drive is provided for the record reader unit and wherein said drive may be operating and the pneumatic reading head disabled when no record is operatively positioned in said reader unit.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 5 is a sketch showing the manner in which

FIGURES 6–13 collectively define the pneumatic circuitry for the instant data processing system.

FIGURE 14 is a table giving the code designations used in the instant system.

Figure 1:
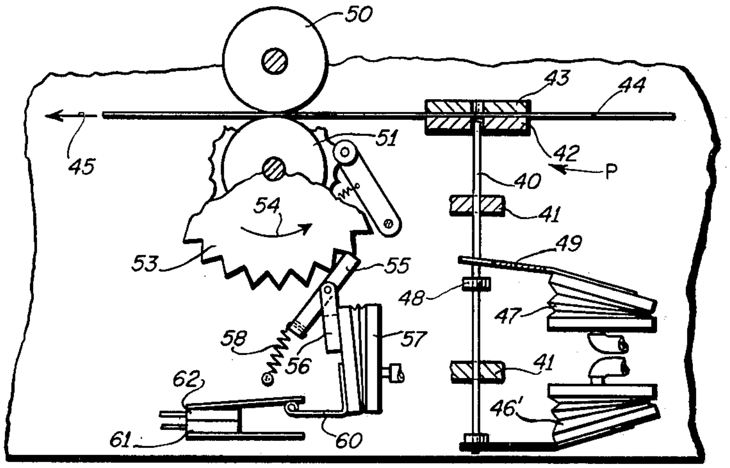
FIGURE 1 is a side elevational view showing an exemplary pneumatically operated punch action and the record feed drive means for the punch unit of the instant system.

The instant pneumatic data processing system essentially comprises three basic units namely an electric typewriter, a record punch, and a record reader; these three units being interconnected by means of pneumatic control circuitry in a manner so as to permit a wide flexibility of selective control and cooperation between said units. The reader and punch units are provided with drive means for feeding or advancing the record at one or more different speeds. The various valves and symbols therefore as used in the present disclosure are similar to those well known in the art and are illustrated in patents such as 2,894,614, 2,964,108, 2,932,375, etc., and it is advisable to become familiar with these valves and symbols before considering the details of the instant circuit diagram. Before discussing any of the details of the pneumatic controls between the typewriter and the punch and reader units the mechanical aspects of the record punching and feeding means for the punch unit and also of the record reading and feeding means for the reader unit will be first described. Unless otherwise stated it will be understood that the various mechanical parts shown and described here are suitable mounted in a machine frame and cooperate in a more or less standard or conventional manner. In that each of the 16 separate record punching actions of the record punch are similar only a single exemplary action need be and is illustrated in FIGURE 1. Here a punch 40 of the punch unit P is vertically reciprocally mounted in a suitable frame or guide means 41 and is axially movable so that its upper end is capable of slidably engaging the walls of two axially aligned holes respectively formed in the closely spaced parallel punch plates 42 and 43 between which the record 44 is adapted to be advanced as indicated by arrow 45. The punch 40 is power operated through an upward record perforating stroke from the normal position shown by means of bellows 46′ and is adapted to be driven downwardly through a return stroke by means of a bellows 47 operating on a flanged portion 48 of the punch through a comb 49 which is common to all the punches. Rotatably mounted on the punch frame is a pair of record feed rolls 50, 51 having rubber coated peripheries which frictionally cooperate so as to be capable of feeding the record 44 in a longitudinal direction as indicated by said arrow 45. Means are provided for rotatably driving the lower feed roll 51, such means comprising a ratchet wheel 53 that is rotatably connected to the roll 51 and which is adapted to be arcuately indexed in a counter clockwise direction 54 by means of an oscillating pawl 55. Pawl 55 is pivotally mounted at the outer end of an arm 56 secured to the movable wall of a bellows 57 which in the operating condition of the system is normally pneumatically retained in the collapsed position shown. A frame anchored spring 58 is provided for lightly biasing the toothed end of pawl 55 into engagement with the teeth of the ratchet wheel 53. The movable wall of bellows 57 is formed with an arm 60 which is disposed between the respective operating fingers of two impulse valves 61 and 62. In its normal collapsed condition shown the bellows 57 maintains the impulse valve 62 open while valve 61 remains closed. When the bellows 57 is in an expanded condition the valve 61 is maintained open while valve 62 remains closed. As will be apparent when pawl 55 is oscillated by the successive operation of bellows 57 the ratchet wheel 53 and record 44 will be intermittently advanced through successive predetermined distances.

Figure 2:
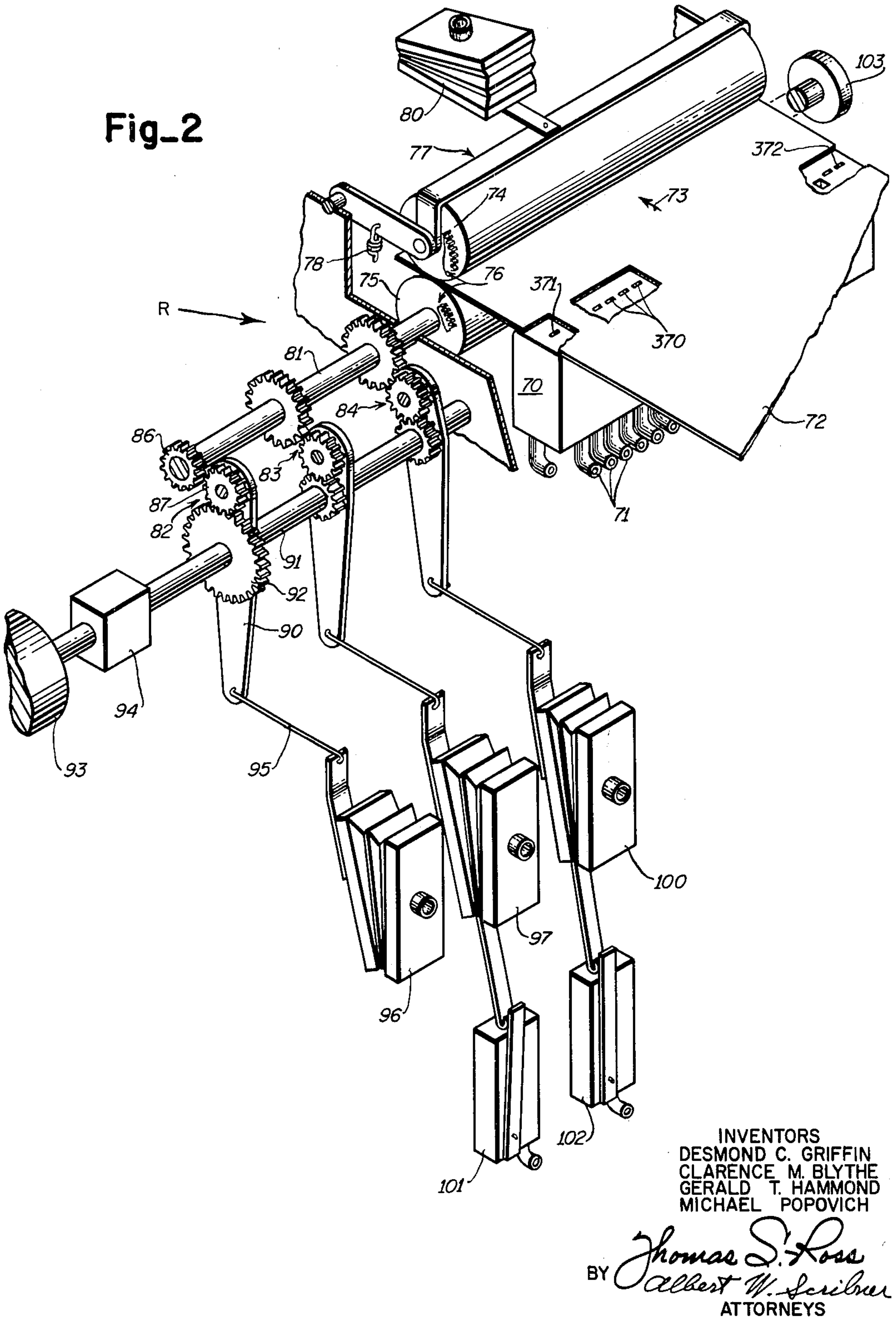
FIGURE 2 is a perspective view showing the pneumatically operated record reader unit and the record feed drive means for the instant reader unit.

The record reader unit R is illustrated in FIGURE 2. Here a reading head or tracker bar 70 is provided, said bar having a plurality of laterally spaced and aligned record sensing holes or ports 370, FIGURES 2 and 13, which are pneumatically connected in the usual manner with their respectively associated output lines 71. As will be apparent if a sub-atmospheric pressure is normally maintained in the lines 71, then an atmospheric pressure impulse will be initiated in any of these lines when a corresponding hole in a perforated record 72 passes over the related sensing port of the tracker bar. The construction and operation of the instant tracker bar is conventional in nature except for the provision of several special sensing holes which will be discussed later. Drive means are provided for feeding the perforated record 72 in a longitudinal direction as illustrated by arrow 73, such means including a pair of cooperating rubber coated record feed rolls 74 and 75 which are rotatably geared together by any suitable gearing 76 when the rolls are in frictional engagement with the record 72. The upper roll 74 is rotatably supported by means of a bail 77 which is biased by means of a spring 78 so that roll 74 is urged toward roll 75. A bellows 80 is operatively connected to the bail 77 so that when collapsed the bellows will move roll 74 away from roll 75 so as to interrupt the feed drive for the record 72. Means are provided for rotatably driving the lower roll shaft 81 at any one of three speeds by means of three selectively operable gear trains 82, 83 and 84. In that each of these gear trains is similar a detained explanation of only one, say 82, is necessary. Here the lower roll shaft 81 has secured thereto a gear 86 that is adapted to be engaged by a pinion 87 which is rotatably mounted on a outer end of a clutch arm 90. The arm 90 is pivotally mounted on a drive shaft 91 adjacent a gear 92 that is secured to said shaft 91 and meshes with the said pinion 87. Shaft 91 is driven by a motor 93 through a suitable speed reducing gear unit 94. The lower end of the clutch arm 90 is connected by a link 95 to a bellows 96. In the normal expanded condition of the bellows 96 the clutch arm 90 maintains the continuously driven pinion 87 out of mesh with the gear 86. When the bellows is evacuated and thus collapses the movement of arm 90 will swing the pinion 87 into operative engagement with gear 86 so as to rotatably drive the lower record feed roll 75 at a predetermined speed. The other two gear trains 83 and 84 are constructed in a similar manner and are respectively controlled by operation of the bellows 97 and 100. For a given speed of the motor the rolls 74 and 75 may be driven at a relatively low speed by gear train 84, as shown in FIGURE 2, during record duplicating or reproducing operation. The record drive rolls may be driven at an intermediate speed by means of the gear train 83 during normal record reading operations while said rolls may be driven at a relatively high eject speed by the gear train 82 when a rapid non-reading advance of the record is desired. When an interruption in the record advance is desired regardless of the particular speed at which the record happens to be driven, the bellows 80 may be collapsed to thereby separate the friction roll 74 from the roll 75 and terminate the record drive action of the rolls. Pneumatic interlock controls are provided for insuring that only one of the gear trains 82–84 is operative at any one time as will be discussed later. The two bellows 97 and 100 are adapted in their normal expanded conditions to respectively maintain the fingers of the two impulse valves 101 and 102 in open positions. When either of these bellows is collapsed by evacuation, the finger of the related impulse valve is permitted to move to a closed position. A knob 103 is provided on one end of shaft 81 so that the record 72 may be manually advanced if desired.

Figure 5:
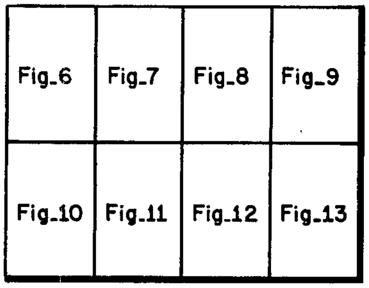
Figure 9:
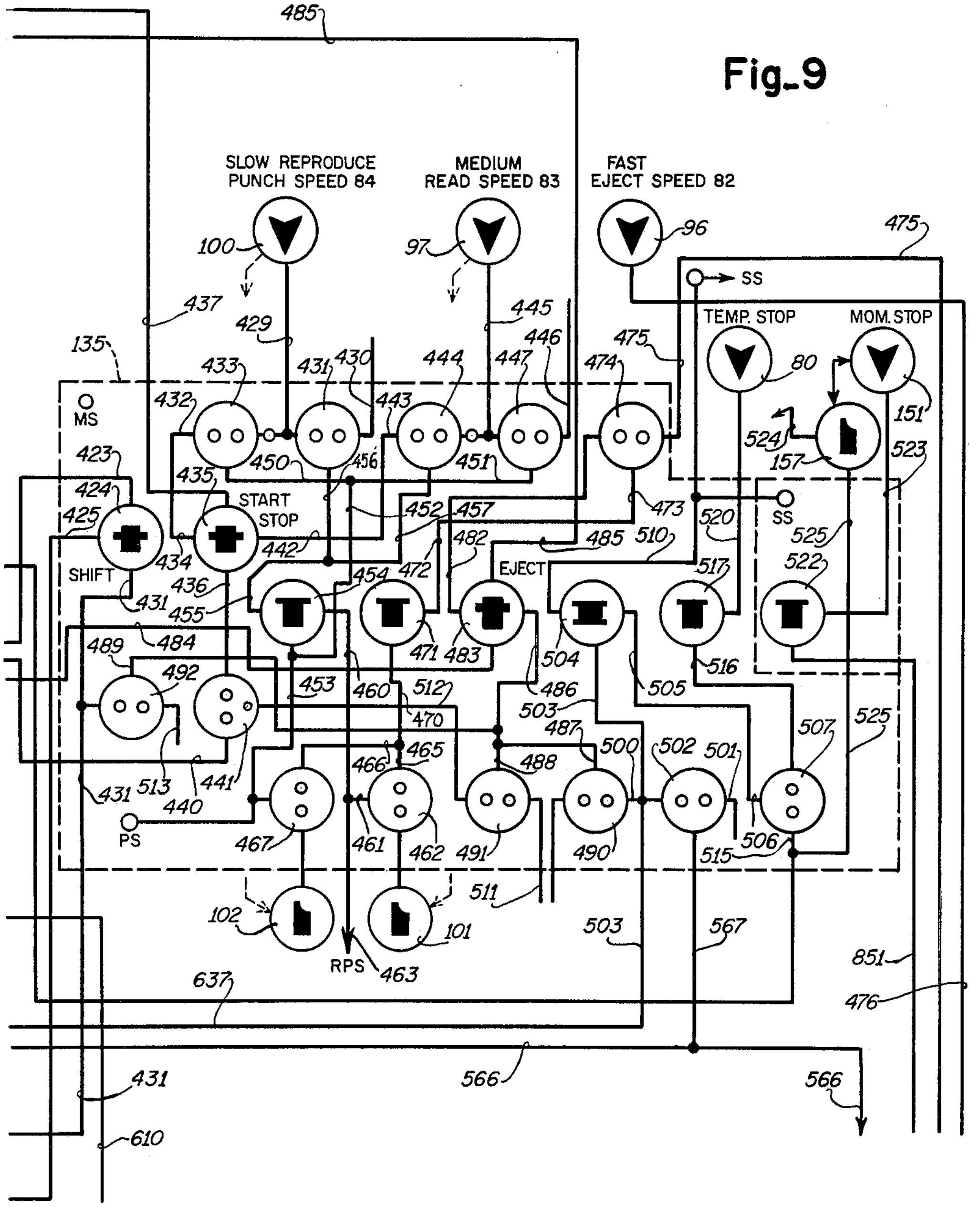
Figure 10:
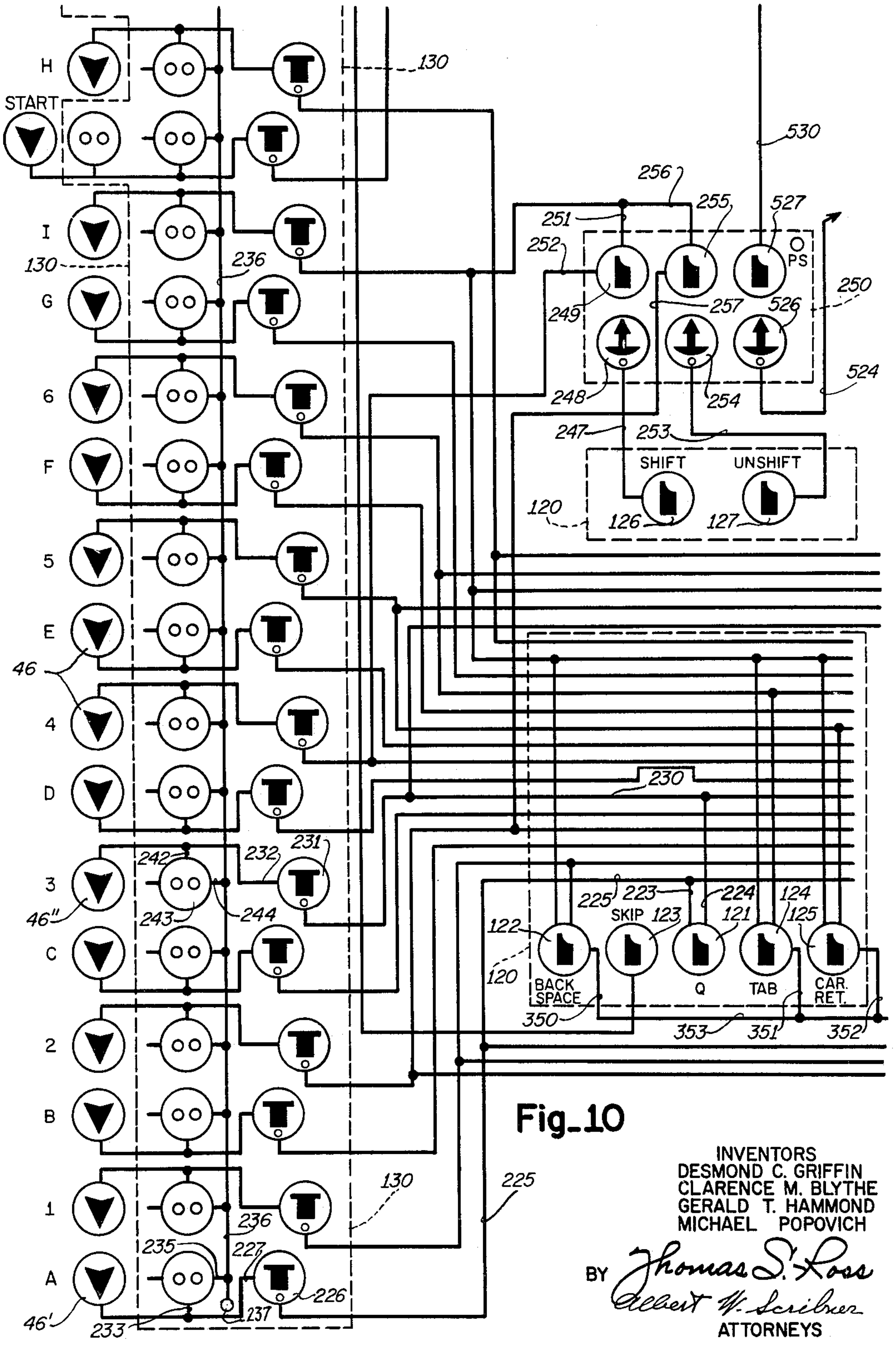
Figure 11:
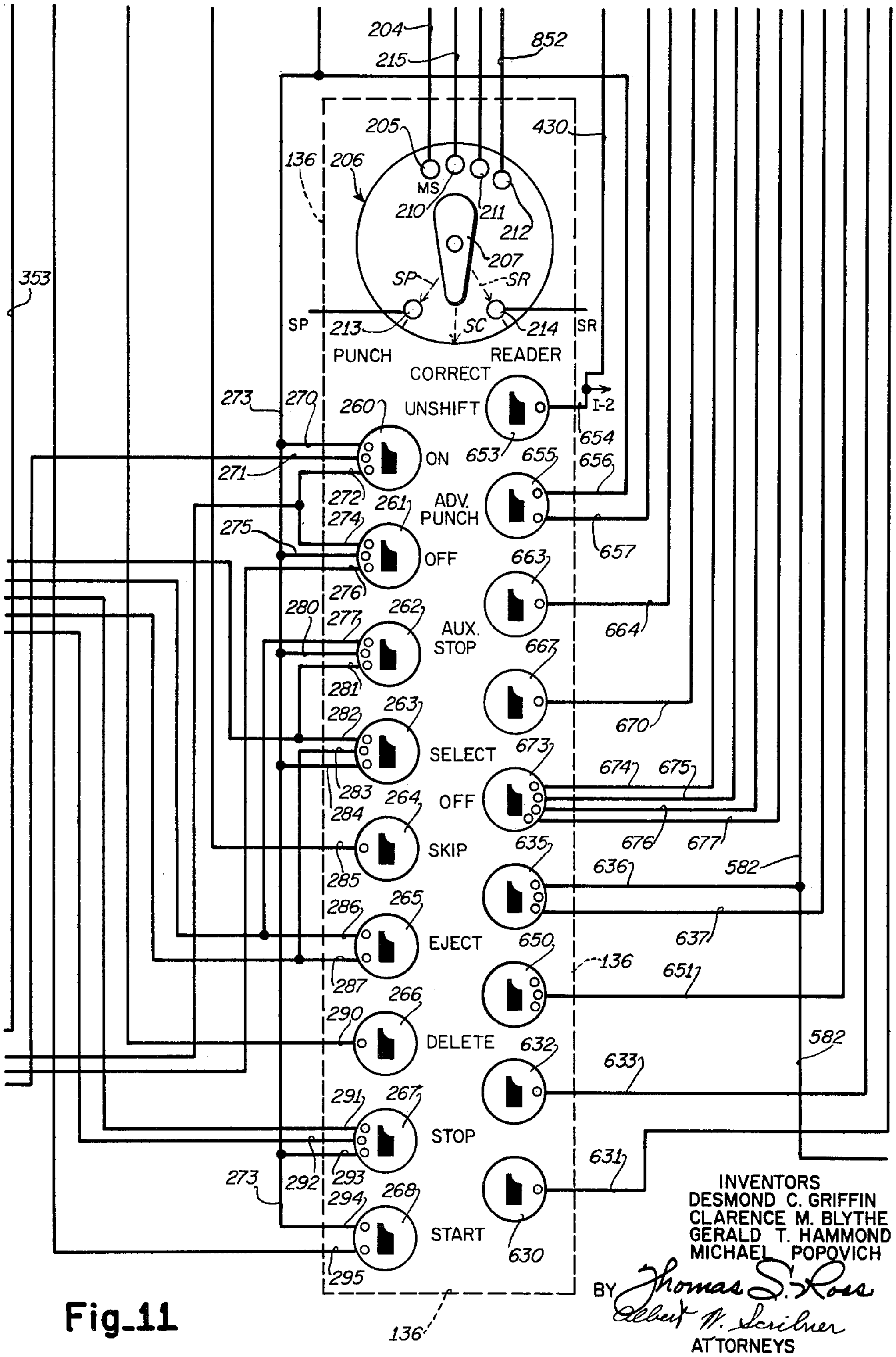

Referring now to the pneumatic control for the instant system FIGURE 5 shows the manner in which FIGURES 6–13 are combined so as to collectively define applicants' pneumatic circuit diagram. A very general statement will first be made in connection with the major elements of the system as they are shown in the circuit diagram. The record punch unit, comprising a plurality of punches as shown in FIGURE 1, is adapted to be operated under the control of the typewriter. The pneumatic controls operated by actuation of the typewriter keyboard are generally indicated by the two dotted line rectangles 120, the keyboard having the usual data key-operated encoding valves, such as 121, which are related to the characters to be typed and also several key operated function control valves such as 122, 123, 124, 125, 126 and 127 which are associated with the various back space, carriage return, shift and similar function keys of the typewriter as will be described later. The harness between the typewriter and the encoding impulse valves, such as 121, may be similar to that shown in said Patent 2,964,108. The keyboard operated controls 120 are adapted to control the operation of both the record punch control valve assembly which is generally indicated by the reference numeral 130, FIGURES 6 and 10, and the punch record feed control valve assembly which is generally indicated by reference numeral 131, FIGURE 6. Each of the 16 separate record punch bellows 46, FIGURE 10, which correspond to the bellows 46′ of FIGURE 1, is adapted to operate a separate record punch as described above for making a designated perforation in the record. The bellows 47 and 57, and the impulse valves 61 and 62 shown in FIGURE 6 of the circuit diagram are those which are shown and described in connection with the FIGURE 1, punch unit apparatus. This drive means for advancing the record is of course operated after each code is perforated in the record. During a record reading operation the typewriter keys are adapted to be power operated by the various pneumatic punch actuators 132 of the selector unit 133, FIGURE 12, these punch actuators being controlled by the record reader unit. The reader unit includes the above described reading head or tracker bar 70, FIGURES 2, 12 and 13, for pneumatically sensing the perforated record 72 and a decoder 134, FIGURE 12, which controls the selective operation of said punch actuators 132 of the selector unit. In this way the various keys of the typewriter are operated so as to type a record corresponding to the data sensed from the perforated record 72. The harness between the punch actuator 132 of the selector unit 133 and the type actions of the typewriter may be similar to that shown in said Patent 2,894,614. The record feed bellows 96, 97 and 100 for the advancing of the perforated record over the reading head, as shown and described in connection with FIGURE 2, are controlled by a valve assembly generally indicated by the reference numeral 135, FIGURE 9, this control valve assembly additionally serving to provide the necessary interlocks for the operation of the bellows 96, 97 and 100 as will be further explained below. A control panel 136, FIGURE 11, is provided for affording a manual control over various parts of the punch and reader pneumatic control circuitry.

Figure 4:
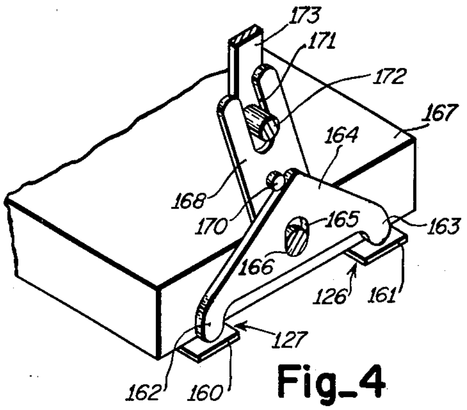
FIGURE 4 is a perspective view showing the construction of another valve control linkage for initiating two distinct pressure impulses in response to the respective forward and reverse strokes of a single cyclic oscillatory movement of a control arm.
Figure 3:
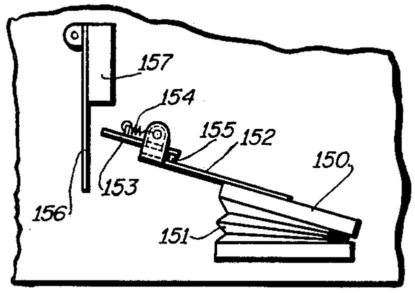
FIGURE 3 is a side elevational view showing the construction of a valve control linkage for initiating a single distinct pressure pulse of short duration in response to the operation of a pneumatic actuator or bellows.

Two special pressure pulse initiating means shown in FIGURES 3 and 4 are provided in the instant apparatus. The valve control apparatus illustrated in FIGURE 3 is for initiating a pneumatic pressure impulse of short time duration in response to a control signal which may exist for a longer period. The movable wall 150 of the bellows 151, FIGURE 3, is provided with an arm 152 having a pivotally mounted pawl 153 thereon that is biased in a clockwise direction by a spring 154 to a normal position determined by engagement of the lower right side of the pawl with a small stud 155 fixed to said arm 152. The pawl is adapted to operate the finger 156 of the impulse valve 157. In operation when the bellows 150 is evacuated the pawl 153 will be swung through an arc so as to engage and displace the impulse valve finger 156 through a short generally clockwise stroke. When the bellows 151 is completely collapsed the pawl 153 will have moved below the lower end of the finger 156 thereby permitting the latter to snap back to its normal closed FIGURE 3 position. The impulse valve is thus momentarily operated so as to initiate an atmospheric pressure impulse of relatively short duration. This short time duration is of course unaffected by the length of time the bellows 151 remains collapsed. When the bellows 151 is expanded the pawl 153 in engaging the end of the impulse valve finger will be rotatably displaced in a counter clockwise direction against the action of spring 154 and will thus ineffectively ratchet back past said impulse valve finger to its normal FIGURE 3 position.

The purpose for the valve control apparatus illustrated in FIGURE 4 is to afford a means for obtaining two different pressure impulses from the respective forward and reverse strokes of a single cyclically oscillated member. The two fingers 160 and 161 are respectively associated with two impulse valves 127 and 126, FIGURES 4 and 10, said fingers being adapted to be alternately displaced by the respective adjacent abutment ends 162, 163 of a triangular operating plate 164. Plate 164 is formed with a central vertically elongated slot 165 in which is disposed a stud 166 that is secured to the valve body 167. An arm 168 pivotally mounted on said stud 166 is provided with a pin 170 which is adapted to engage the inclined side of the upper apex portion of said triangular plate 164. The upper end of arm 168 is formed with a slot 171 in which is disposed a lug 172 that is secured to the end of a lever 173. In the instant apparatus the lever 173 forms part of the case shift linkage of the typewriter. The impulse valve fingers 160, 161 normally engage the ends 162, 163 of the triangular plate and maintain the latter in an elevated position wherein the lower end of the plate slot 165 is near the stud 166 as shown in FIGURE 4. When the typewriter is shifted to an upper case condition the lever 173 will be moved so as to swing the arm 168 in a clockwise direction, FIGURE 4, whereby the pin 170 will momentarily cam the triangular plate so that the right hand end 163 engages and lowers the finger 161 of the impulse valve 126 as said pin 170 wipes past the apex of said plate. At the completion of this stroke of the lever 168 the pin 170 will be on the right side of the plate apex and the plate 164 will move to its normal FIGURE 4 position wherein both of said impulse valves 126, 127 are closed. The operation of the impulse valve finger 161 will cause the valve 126 to initiate a pressure impulse in its assocaited output line. When the typewriter is unshifted, i.e. changed back to a lower case condition, the arm 168 will be caused to swing in a counterclockwise direction and the pin 170 in wiping past the apex of said triangular plate will cause the plate end 162 to swing downwardly in a generally counterclockwise direction so as to thereby engage and downwardly displace the impulse valve finger 160 and thus initiate a pressure impulse in the output line associated with the impulse valve 127. At the end of the counterclockwise stroke of arm 168 the pin 170 will be on the left side of the plate apex as shown in FIGURE 4 and the triangular plate will again be biased to its normal upper position shown wherein both of said impulse valves 126, 127 are closed. In this manner a different pressure impulse is obtained for the respective forward and reverse strokes of the oscillating cyclically operated typewriter case shift linkage lever 173.

In order to fully understand the operation of the pneumatic circuit diagram of FIGURES 6–13 it is necessary to be familiar with the construction and operation of the various pneumatic valves employed. These valves and their symbols are fully discussed in prior art patents such as those cited above. Unless otherwise indicated the valves and associated arrangements are the same for the instant disclosure as set forth in said patents. In the instant diagram, unles otherwise stated, the abrupt end of a pneumatic line may be considered open to the atmosphere and valve symbols having small circles therein denote that the valves are connected through a bleed hold to a sub-atmospheric pressure supply in the usual manner. Control lines connected to the upper side of an on-off valve may be considered to be arranged for turning the valve off while those connected to the lower side turn the valve on.

The main vacuum or sub-atmospheric pressure pump 200 (FIGURE 7) and associated conventional type safety valve 201 are connected so as to afford a sub-atmospheric pressure supply to the various valve assemblies. One main supply line 202 is connected to supply the large primary valve assembly 203 (FIGURE 6) whose output controls the sub-atmospheric pressure supply for the record punch unit. The other main supply line 204 (FIGURE 7) is connected to the port 205 (FIGURE 11) of the manually operated main control switch 206. The switch handle 207 may be manually set in any one of three different positions, namely a punch position SP, a correct position SC or a reader position SR. This main pneumatic control switch is provided with five ports 210–214 in addition to said supply port 205. The pneumatic connection between said ports when the switch handle 207 is in its different positions is as follows. When the handle is in the punch position SP the port 205 is pneumatically connected to both ports 210 and 213. When the handle is in a correct position SC port 205 is connected to port 212 and when the handle is in the reader position SR the port 205 is connected to port 214 and the port 210 is connected to port 211. The general mechanical construction of this type of main switch is conventional in nature and being well known need not be particularized here. As will be apparent when the switch handle is in the punch position SP a sub-atmospheric pressure will exist in all the lines and valves that are marked SP. Similarly when the switch handle is in the reader position SR a sub-atmospheric pressure will exist in all lines and valves that are marked SR. When a sub-atmospheric pressure supply exists at port 213 no such supply exists at port 214, and vice versa.

It will be understood that when the switch 206 is in any of its punch, correct, or reader conditions a sub-atmospheric pressure supply will be operatively connected to those pneumatic valve assemblies required for the operation called for by the said switch condition as is well understood in the art. The encircled letters PS, MS or SS appearing in the various dotted line rectangles of the circuit diagram mean that that particular valve assembly is pneumatically connected to the sub-atmospheric punch supply, the main supply, or the selector supply respectively as will be further explained below. When a normal record punching operation is to be performed the main switch ports 205 and 210 are connected and a sub-atmospheric pressure supply exists in the switch port 210 and line 215 which is connected to the control line 216 (FIGURE 6) of said punch supply primary valve 203. Thus with the primary valve 203 in its normal condition a sub-atmospheric pressure will exist in the valve output line 217 thereby affording the necessary pressure supply for the said pneumatic control valve assemblies 131, FIGURE 6, which controls the operation of said punch record feed bellows 47 and 57, FIGURES 1 and 6, and to the punch bellows control valve assembly 130 through lines 220 and 221, and to various other valve assemblies labelled with the encircled letters PS.

Figure 6:
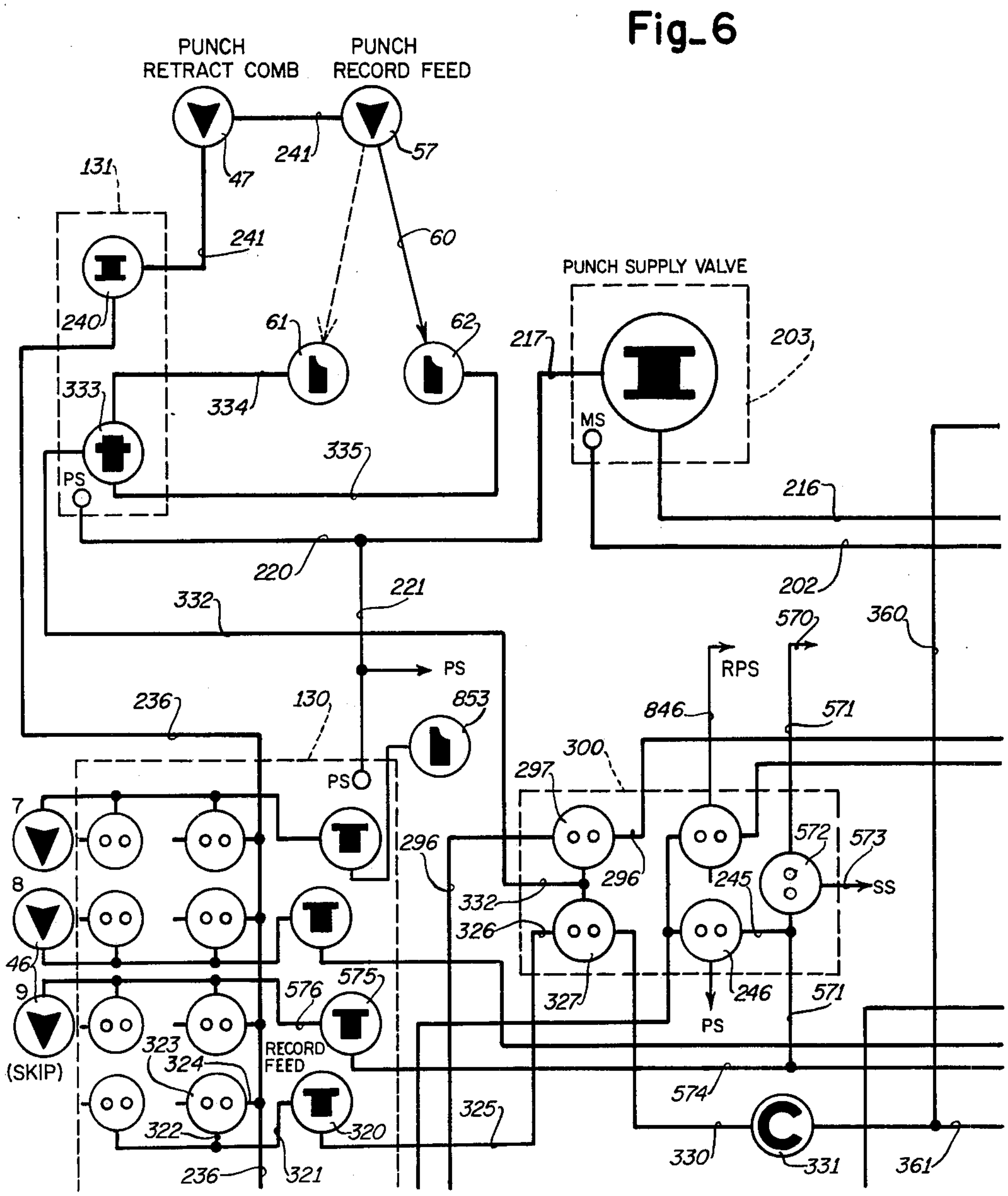
FIGURES 6–13 are relatively oriented in order to collectively define the instant pneumatic circuit diagram.

The pneumatic circuitry for operating the punch unit under the control of the typewriter will now be described. The operation of each power action of the electric typewriter is adapted to operate an impulse valve which initiates a pair of coded pressure impulses in a manner similar to that illustrated in said Patent 2,964,108. Let it be assumed that the said impulse valve 121, FIGURE 10, of the valve assembly 120 is exemplary of any of the character typing actions of the typewriter and that the other typing actions operate in a corresponding manner. The impulse valve, which is operated when the letter "*q*" is to be typed, has two output lines 223 and 224. The line 223 is connected to the control line 225 of a secondary valve 226 whose output line 227 is connected to the bellows 46′, FIGURES 2 and 10. The other output line 224 from the impulse valve 121 is connected to the control line 230 of a secondary valve 231 whose output line 232 is connected to the punch bellows 46″. As will be apparent when a "*q*" is typed the impulse valve 121 will be opened and the resultant atmospheric pressure pulses in the control lines 225 and 230 will cause the secondary valves 226 and 231 to operate so as to collapse the bellows 46′ and 46″ thereby punching a pair of code holes A and 3 in the record, said A–3 code combination being representative of the letter "*q*." The designation for each code bit punched in the record by the various punch bellows 46, shown in FIGURES 6 and 10, are listed adjacent the respective bellows and in accordance with the code designations or hole combinations given in the table of FIGURE 14. After the punch bellows 46′, 46″ and the associated punches such as 40, FIGURE 1, have been thus operated they must be withdrawn and the record advanced a step preparatory for the next punching operation. To this end the output line 227 of secondary valve 226 associated with the punch bellows 46′ is connected by a line 233 so as to control a blocking valve 234 having a flow line 235 that is connected to a common control line 236. Line 236 which is normally evacuated through the bleed hole 237 is connected so as to control a primary valve 240, FIGURE 6, in the record feed control valve assembly 131. The output line 241 of the primary valve 240 is serially connected to the bellows 47 and 57 described above in connection with FIGURE 1. In similar fashion the output line 232 for the secondary valve 231 associated with the punch bellows 46″ is connected through line 242 so as to control a blocking valve 243 whose flow line 244 is also connected to said common control line 236. As shown in the circuit diagram the control circuit for each bellows 46 is pneumatically connected to the common control line 236 in the same manner as that just described for bellows 46′ and 46″. As noted above the common control line 236 is normally evacuated and thus a sub-atmospheric pressure will normally exist in the output line 241 of the primary valve 240 thereby normally retaining both the bellows 47 and 57 is collapsed condition. When the record punch bellows 46′ and 46″ (or any of the other bellows 46) are operated as above described so as to perforate the record 44, FIGURE 1, an atmospheric pulse will always be initiated in the common control line 236 so as to initiate a feed movement of the record. This atmospheric pulse in line 236 will operate the primary valve 240 so that an atmospheric pressure will exist in the output line 241 and hence both bellows 47 and 57 will be opened or expanded. The collapsing of the punch bellows 46 which serves to perforate the record 44, FIGURE 1, and the expanding of the bellows 47 and 57 occur at about the same time; the expanding of bellows 47 lifting the common punch restoring comb 49, FIGURE 1, permitting the upward movement of the punches, such as 40, while the expansion of bellows 57 idly ratchets the pawl 55 to the right, FIGURE 1, preparatory for a subsequent record indexing movement in the opposite direction upon the immediately following collapsing of said bellows 57.

Upon termination of the atmospheric pulses which operate the punch bellows 46, the pulse in said common control line 236 will also be terminated and the primary valve 240 in being restored to normal condition will evacuate and collapse the bellows 47 and 57; the bellows 47 through said common comb 49 thereby serving to withdraw the actuated punches from the record and the bellows 57 thereby serving to move the pawl 55 to the left, FIGURE 1, so as to advance or index the ratchet wheel 54 and the record 44 through a predetermined distance preparatory for the next code punching and record feeding operation. These successive punching and feeding operations continue as long as the typing keys of the typewriter are serially operated. When a non-printing control function key of the typewriter is operated, such as back space, carriage return, etc., an appropriate two hole code is perforated in the record in substantially the same manner as that just described for character codes.

The pneumatic circuits for the various typewriter function controls will now be discussed. The impulse valve 122, FIGURE 10, associated with and operated by the typewriter back space linkage is connected to perforate a I–1 code in the record while the impulse valve 124 associated with and operated by the typewriter tabulating linkage is connected to perforate a I–6 code. The impulse valve 125 associated with and operated by the typewriter carriage return linkage is connected to perforate a I–5 code in the record. A special key is provided on the typewriter keyboard so as to be adapted to operate the impulse valve 123 which is connected through the flow lines 245 of the open blocking valve 246, FIGURE 6, and through lines 571 and 574 so as to control the perforating of a single number 9 code hole in the record as will be further discussed later. The control valve assembly 120 also includes the impulse valves 126 and 127, FIGURE 10, which are operated in response to case shift movements of the typewriter in the manner above described in connection with FIGURE 4. When the typewriter is shifted from lower to upper case the shift impulse valve 126 will be operated as described above so as to perforate an I–4 code in the record. The pressure impulse initiated in the output line 247 of the shift impulse valve 126 is amplified and encoded by the signal booster valve combination of the pouch actuator 248 and the impulse valve 249 which is part of the booster valve assembly 250 and which has two output control lines 251 and 252 which control the punching of said I–4 code in the record. The valve combination of the pouch actuator 248 and the impulse valve 249 may be structurally similar to that illustrated in FIGURE 1 of U.S. Patent 2,932,375. When the typewriter is unshifted from upper case to lower case the impulse valve 127 will be operated as above described. The pressure impulse in output line 253 of impulse valve 127 is amplified and encoded by another booster valve combination of a pouch actuator 254 and impulse valve 255, the two output lines 256 and 257 of the impulse valve 255 being connected so as to control the punching of an I–2 code in the record. As will be apparent the serial operation of service or control function keys of the typewriter and also the character keys will all serve to effect a serial perforating of the record 44 codes that respectively correspond to the particular typewriter keys operated.

In addition to being controlled by operation of the typewriter the record punch unit may be controlled and operated in a similar manner from the control panel 136, FIGURE 11, for perforating certain special codes in the record. Along the left side of the control panel 136 there is provided a row of nine manually operable impulse valves 260–268 each of which is associated with the punching unit and is adapted to perforate a particular code in the record which is representative of some record feed control and some special other function the purposes of which will be discussed later. These nine impulse valves 260–268 will be referred to as the punch on, punch off, auxiliary stop, select, skip, eject, delete, stop, and start valves respectively. The pouch on valve 260 has three output lines 270, 271 and 272, lines 271 and 272 being connected so as to control the perforation of an A–2 code in the record while the other line 270 is connected to a common special record feed control line 273. The purpose of line 273 will be presently discussed. The punch off impulse valve 261 has three output lines 274, 275 and 276; lines 274 and 276 being connected to control the perforating of an A–1 code in the record while the other line 275 is connected to said common special record feed control line 273. The auxiliary stop impulse valve 262 has three output lines 277, 280, and 281, lines 277 and 281 being connected to control the perforating of an H–6 code in the record while the other line 280 is connected to said common line 273. The select impulse valve 263 has three output lines 282, 283, and 284; lines 282 and 283 being connected so as to control the perforation of a H–5 code in the record while the other line 284 is connected to the common line 273. The skip impulse valve has one output line 285 which is connected so as to perforate a single number 9 hole in the record. The eject impulse valve 265 has two lines 286 and 287 which are connected so as to perforate a 5–6 code in the record. The delete impulse valve 266 has one output line 290 which is connected so as to perforate a number 8 hole in the record. The stop impulse valve 267 has three output lines 291, 292 and 293, lines 291 and 292 are connected so as to control the perforation of an I–3 code in the record while the line 293 is connected to the common line 273. The start impulse valve 268 has two output lines 294 and 295, line 295 being connected through the flow lines 296 of a blocking valve 297 so as to control the perforation of a start code by operation of the start punch bellows of FIGURE 10. The above mentioned blocking valve 246 and the blocking valve 297 form part of a blocking valve assembly 300. When the handle 207 of the main control switch 206 is in the punch position SP the manual operation of any of the punch unit control impulse valves 260–268 will effect a record punching and feeding operation similar to that above described for the keys of the typewriter.

When a record has been perforated and is to be read or sensed by the reader unit of the instant pneumatic data processing system there are several operations of the mechanical parts of the apparatus which take a little longer to execute than the time required for just typing a character. An example of such an operation is when the typewriter carriage is to be returned. Here it takes a relatively long period of time for the carriage return movement to be completed and obviously no typing or similar operations should be attempted during this period. If, as here occurs, the record is continuously fed over the reading head or tracker bar 70, as is illustrated in FIGURE 2, then it is apparent that during a reading operation an empty or non-perforated space must be provided in the record after a carriage return code perforation, this empty space being sufficiently long so as to permit the completion of the carriage return movement of the typewriter before the next hole coded in the moving record is sensed by the tracker bar 70. From this discussion it will be apparent that when the record is initially being perforated every time a long duration service function code, such as a carriage return code I–5, is being punched in the record the record should be immediately thereafter be advanced a few steps without being perforated. Means are provided in the instant system for automatically advancing the record 44, FIGURE 1, through four or five steps after punching any one of the several codes whose function execution during a subsequent reading operation will require a relatively long period to complete. The service functions requiring this short empty or non-perforated space in the record include the carriage return, tab and back space operations. Also means are provided so that when certain of the said punch control impulse valves of the control panel 136 are manually operated to perforate the record a similar extra non-punching advance of the record is accomplished. These special means for automatically advancing the record through several extra spaces will now be explained. Referring to the pneumatic record feed control for the punch unit as shown in FIGURES 1 and 6, it was explained above that the record feed bellows 57 is adapted to be operated each time one of the record punching bellows 46 is operated. There is however an additional record feed secondary valve 320 which does not control the operation of a punch bellows but has an output line 321 which is connected to the control line 322 of a blocking valve 323 having a flow line 324 which is connected to the said common record feed line 236 which controls the operation of said record feed bellows 57. After any one of the above noted long duration type codes is punched in the record a predetermined number of successive atmospheric pressure impulses are automatically initiated in the control line 325 of said secondary valve 320 so that the record will be advanced a corresponding number of spaces. The means for automatically initiating this predetermined number of impulses comprises a pneumatic capacitance circuit which is fully shown and described in the commonly owned copending patent application by Clarence M. Blythe and Gerald T. Hammond, Serial No. 122,477, for Pneumatic Capacitor and filed on or about July 14, 1961, now U.S. Patent 3,127,746. This capacitor type of apparatus and circuit is included in the instant diagram and will be briefly discussed here for review purpose. If further details as to construction or operation of this type of circuit is desired reference may be made to said copending application. The control line 325 (FIGURE 6) of the secondary valve 320 is connected through the flow lines 326 of the blocking valve 327 to the output line 330 from a pneumatic storage tank or capacitor 331 that has a predetermined storage volume. The blocking valve 327, as well as the adjacent blocking valve 297, is controlled by the output line 332 of the on-off valve 333 having control lines 334 and 335 that are respectively connected to said impulse valves 61 and 62. As the on-off valve 333 is turned on and off by the alternate operation of the bellows controlled impulse valves 61 and 62 the blocking valve 327 will be alternately opened and closed thereby permitting a succession of atmospheric pressure pulses to flow from the capacitor 331 to the secondary valve 320 so as to repeatedly operate the record feed bellows 57. The succession of atmospheric pulses from the capacitor 331 continues until all the air stored in the capacitor is exhausted whereupon further advancing of the record stops. As was mentioned above in connection with FIGURE 1 the bellows 57 is normally collapsed and the impulse valve 62 is thus normally open while the impulse valve 61 is closed. Upon expansion of said bellows 57 the impulse valve 62 is closed and the impulse valve 61 is opened. Under these conditions the on-off valve is normally on thereby causing a sub-atmospheric pressure to exist in the output line 332 which in turn retains the blocking valve 327 in an open position. The blocking valve 327 being normally open causes the capacitor 331 to be normally evacuated with the result that even though during each regular punching operation the on-off valve 333 is operated and the blocking valve 327 is thereby also opened there will normally be no air available to the repeat record feed secondary valve 320 for repeatedly advancing the record as above described. When however one of the special long duration type codes, such as a carriage return I–5 code, is perforated in the record the capacitor will be filled with air as will be described and will thus be capable of prompting, through the open blocking valve 327, a repetitive actuation of the secondary valve 320 and thus the record feed bellows 57 to thereby advance the record through several spaces. The pneumatic connections for filling the capacitor when said long duration type codes are to be punched in the record are as follows. The output lines 350, 351 and 352 from the back space, tab and carriage return impulse valves 122, 124 and 125 of typewriter keyboard control 120, FIGURE 10, are connected to a common line 353 that is connected to a temporary stop pouch actuator 354, FIGURE 8, of a signal amplifying or booster valve assembly 355. The impulse valve 356 operated by the pouch actuator 354 has a first output line 357 which is connected to a common control line 360 which in turn is connected to an input line 361 to said capacitor 331. The above noted common control line 273 connected to several of the manually operated impulse valves of the control panel 136 is also connected to the input line 361 of said capacitor. As will be apparent when an impulse valve associated with the back space, tab, or carriage return keys of the typewriter, or a punch on, punch off, auxiliary stop, select, and start impulse valve of the control panel 136 are operated to punch a corresponding code in the record the capacitor 331 will at the same time be filled with air thereby permitting the desired predetermined number of extra non-punching record feeding steps of the feed bellows 57. This will enable the record tape to be properly read as it continuously moves over the tracker bar 70 during subsequent record reading operations.

Figure 12:
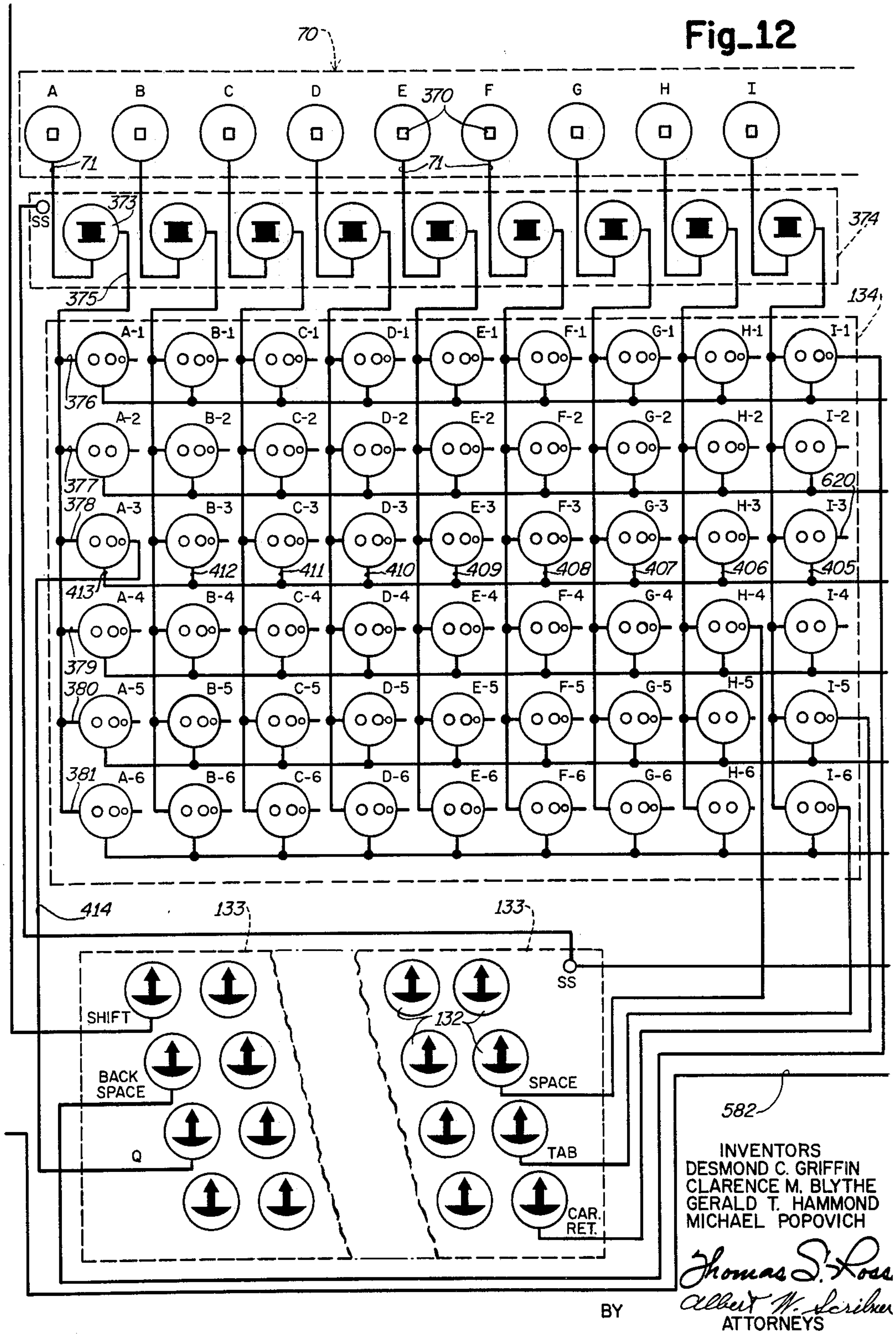

Let it be assumed that a perforated record has been made and that it is desired to read the same and reproduce the data in said record either by typing the information or by making a new but identical perforated record, or both. The record reader unit is provided with a pneumatic reading head or tracker bar 70 and an associated three speedrecord feed drive means as was discussed in connection with FIGURE 2. The tracker bar 70 is provided with a plurality of record sensing apertures or holes 370 which are respectively noted in FIGURES 12 and 13 with number or letter designations which correspond to the code of designations shown adjacent the various punch bellows 46 of FIGURES 6 and 10. The two extra holes 371, 372 diagrammatically shown in FIGURE 13 as being at the right end of the tracker are actually disposed at the opposite ends of the tracker bar as shown in FIGURE 2. The tracker bar holes designated A through I and 1 through 6, and used for the two hole data codes indicated by the table in FIGURE 14, are operatively connected to the pneumatic decoder 134, FIGURE 12. The holes designated start, 7, 8, 9 and 371, 372 are used for special or function control circuits as will be subsequently discussed. The data code holes A and I and 1 to 6 are operatively connected to the rectangular coordinate type decoder 134 so that each of the nine letter coded holes A to I of the tracker bar controls the operation of an associated vertical column of blocking valves in the decoder, while each of the six numbered holes 1 to 6 of the tracker bar controls the operation of an associated horizontal row of the same blocking valves of said decoder. As will be apparent when a perforated record code comprising one letter hole and one number hole are read one vertical column and one horizontal row of the decoder blocking valve matrix arrangement will become operatively conditioned so that the one blocking valve representing the intersection of said one column and one row will give a single output impulse which defines the decoded information or character which is to be typed. In that the connections and operations controlled by the reading of each two hole data or character code are similar a detailed explanation of only one such code will be given here. Let it be assumed that the said code A–3 for the letter *q* is to be read. The A hole of the tracker bar is connected by its associated line 71 so as to control the primary valve 373 of the valve assembly 374. The output line 375 of valve 373 is connected in parallel to the flow lines 376 through 381 of the respective blocking valves A–1 through A–6 which are arranged in a vertical column as illustrated in FIGURE 12. In that a sub-atmospheric pressure normally exists in the output line 375 from the primary valve 373 a vacuum supply will be normally available in the flow lines 376 to 381 of said vertical column of blocking valves. The 3 hole of the tracker bar is connected by its associated line 71 through the flow line 400 of a blocking valve 401 so as to control the secondary valve 402 of the valve assembly 403. The output line 404 of valve 402 is connected to each of the control lines 405 through 413 of a horizontal row of blocking valves A–3 through I–3 respectively. In that an atmospheric pressure normally exists in the output line 404 of the secondary valve 402 the said horizontal row of blocking valves will all be normally closed. As will be apparent when the *q* code A–3 is sensed the resultant atmospheric impulse through the A hole of the tracker bar will cause the secondary valve 373 to operate and thereby admit atmospheric pressure to all the flow lines 376 to 381 of the said vertical column of blocking valves. Simultaneously the atmospheric impulse through the 3 hole of the tracker bar after passing through the open blocking valve 401 operates the secondary valve 402. The resultant sub-atmospheric pressure existing in the valve output line 404 will open all the blocking valves in said horizontal row. The A–3 valve at the intersection of said column and row of blocking valves is thus the only blocking valve of the decoder 134 which is opened and has an atmospheric pressure available in the flow lines thereof. The flow line 414 of the blocking valve A–3 is connected to the *q* pouch actuator of the selector unit 133, this pouch actuator being adapted to operate the *q* bar linkage of the type writer in the usual manner.

Each of the various blocking valves of the decoder 134 is connected to an associated pouch actuator of the selector unit 133 in a manner corresponding to that just described for the valve A–3 so as to operate a related linkage of the typewriter in response to the respective codes sensed from the record. As is indicated in FIGURE 12 the blocking valves H–4, I–1, I–5 and I–6 of the decoder 134 are operatively connected so as to control the pouch actuators respectively associated with the space, back space, carriage return and tab function linkages of the typewriter. The blocking valve I–4 (for case shaft) is operatively connected by a line, not shown, to the pouch actuator 420 of said booster valve assembly 355, FIGURE 8, the pouch actuator 420 being mechanically connected to operate the impulse valve 421. The output line 422 of the impulse valve 421 is connected to the off control line 423 of a conventional type bistable pneumatic on-off valve 424. The output line 425 of valve 424 is connected to the shift pouch actuator of the selector unit 133, FIGURE 12; this pouch actuator serving to shift the typewriter from lower to upper case condition. The output flow line of the unshift blocking valve I–2 of the decoder 134 is operatively connected by a line not shown to a line 430, FIGURE 11, which in turn is connected to the on control line 430*a* of said on-off valve 424, FIGURE 9. It will be apparent then that during a record reading operation the case shift control linkage of the type writer will be held in either an upper or lower case condition by the on-off valve 424 which is controlled by the shift and unshift blocking valves I–4 and I–2 of the decoder 134. In accordance with the operation of the above described data and function control codes the typewriter will be successively operated as the record 72 is continuously moved over the reading head or tracker bar 70 by the record feed apparatus discussed above in connection with FIGURE 2.

Before discussing the special control codes and the connections associated with the tracker holes designated start, 7, 8, 9 and 371, 372, the pneumatic controls for the record feed drive means of the record reader will be considered first. As illustrated in FIGURE 2 the three bellows 96, 97 and 100 may be selectively operated in order to control the speed at which record is fed over the tracker bar 70 while the bellows 80 is operable to temporarily interrupt any feeding movement of the record by separating the feed roll 74 from roll 75. These four bellows together with the momentary pulse control bellows 151 described in connection with FIGURE 3 are shown in FIGURE 9 of the circuit diagram and a discussion of some of the interlocking pneumatic controls associated therewith will now be made. These pneumatic controls are primarily effective to insure at all times that when a record feed movement is called for one and only one of the three gear trains 82, 83 and 84, FIGURE 2, is operatively engaged at any one time. Referring to FIGURE 9 the slow reproduce punch speed bellows 100 is connected by a line 429 to the open ended flow line 430 of a blocking valve 431 and to the flow line 432 of a blocking valve 433. Flow line 432 is connected to the output line 434 of a start-stop on-off valve 435, which has on and off control lines 436 and 437, line 436 being connected to the flow lines 440 of a blocking valve 441. The other output line 442 from the start-stop on-off valve 435 is connected to the flow lines 443 of a blocking valve 444, said flow lines 443 being connected to a line 445 to the medium speed bellows 97. Line 445 is also connected to the flow lines 446 of a blocking volve 447 and the control lines 450 and 451 of blocking valevs 433 and 447 are connected by line 452 to the control line 453 of a secondary valve 454. One output line 455 of valve 454 is connected to the control lines 456 and 457 of said blocking valves 431 and 444. The other output line 460 of the secondary valve 454 is connected to the control line 461 of a blocking valve 462 and continues on to other parts of the circuit as indicated by the arrow 463. The letters R.P.S. (reverse punch supply) adjacent the arrow 463 are indicative of the fact that the pressure in the line 460 is opposite or reversed from the punch supply pressure conditions to the secondary valve 454, i.e. when the punch supply pressure in the valve control line 453 (which is connected to the sub-atmospheric punch supply pressure as indicated) is on a sub-atmospheric pressure will exist in the valve control line 453 while an atmospheric pressure will exist in the valve output line 460; conversely when an atmospheric pressure exists in the control line 453 a sub-atmospheric pressure will exist in said output line 460, the valve assembly 135 being operatively connected in the usual manner to the main pressure supply as indicated by the encircled letters MS. The line 460 is connected by appropriate interconnecting lines to certain valves marked R.P.S. (reverse punch supply); these interconnecting lines not being shown in the circuit diagram in order to promote clarity. The flow lines 465 of blocking valve 462 are connected to the impulse valve 101, note FIGURE 2, and to the flow lines 466 of a blocking valve 467. The flow lines 466 are connected to the impulse valve 102, note FIGURE 2. The flow lines 465 of blocking valve 462 are connected to the control line of a secondary valve 471 having an output line 472 that is connected to the control line 473 of a blocking valve 474. The flow line 475 is connected to the control line 476, FIGURE 13, of a blocking valve 477, said control line 476 also being connected to a line 480 which connects back up to the fast eject speed bellows 96. The flow line 475 of valve 474 is also connected to one output line 482 of an eject on-off valve 483 having two control lines 484 and 485. The other output line 486 is connected to the control lines 487 and 489 of the three blocking valves 490, 491 and 492. The flow lines 500 of blocking valve 490 are connected to the flow lines 501 of a blocking valve 502 and to the control line 503 of a selector unit pressure supply primary valve 504 having a first output line 505 that is connected to the control line 506 of a blocking valve 507 and a second output line 510 that is connected to the selector supply line, not shown, as indicated by the letters SS. The line 510 is connected to those various other lines and/or valve assemblies of the circuit that are also designated by the letters SS, some of these line connections not being shown for the sake of clarity in the circuit diagram. The flow lines 511 of said blocking valve 491 are connected to the control line 512 of said blocking valve 441 while the flow lines 513 of the blocking valve 492 are connected to the said control line 430*a* of the shift on-off valve 424. The flow lines 515 of the blocking valve 507 are connected to the control line 516 of a secondary valve 517 whose output line 520 is connected to said temporary stop bellows 80, note FIGURE 2.

A secondary valve 522 is provided having an output line 523 connected to the said momentary stop bellows 151, note FIGURE 3, which cooperates in the manner described with the impulse valve 157 to give a momentary pressure impulse in the two valve output lines 524 and 525. Line 525 is connected to the flow lines 515 of blocking valve 507 while line 524 is connected by a line not shown to the pouch actuator 526, FIGURE 10, of the signal booster valve assembly 250. The actuator 526 is adapted to operate an impulse valve 527 having an output line 530.

Figure 13:
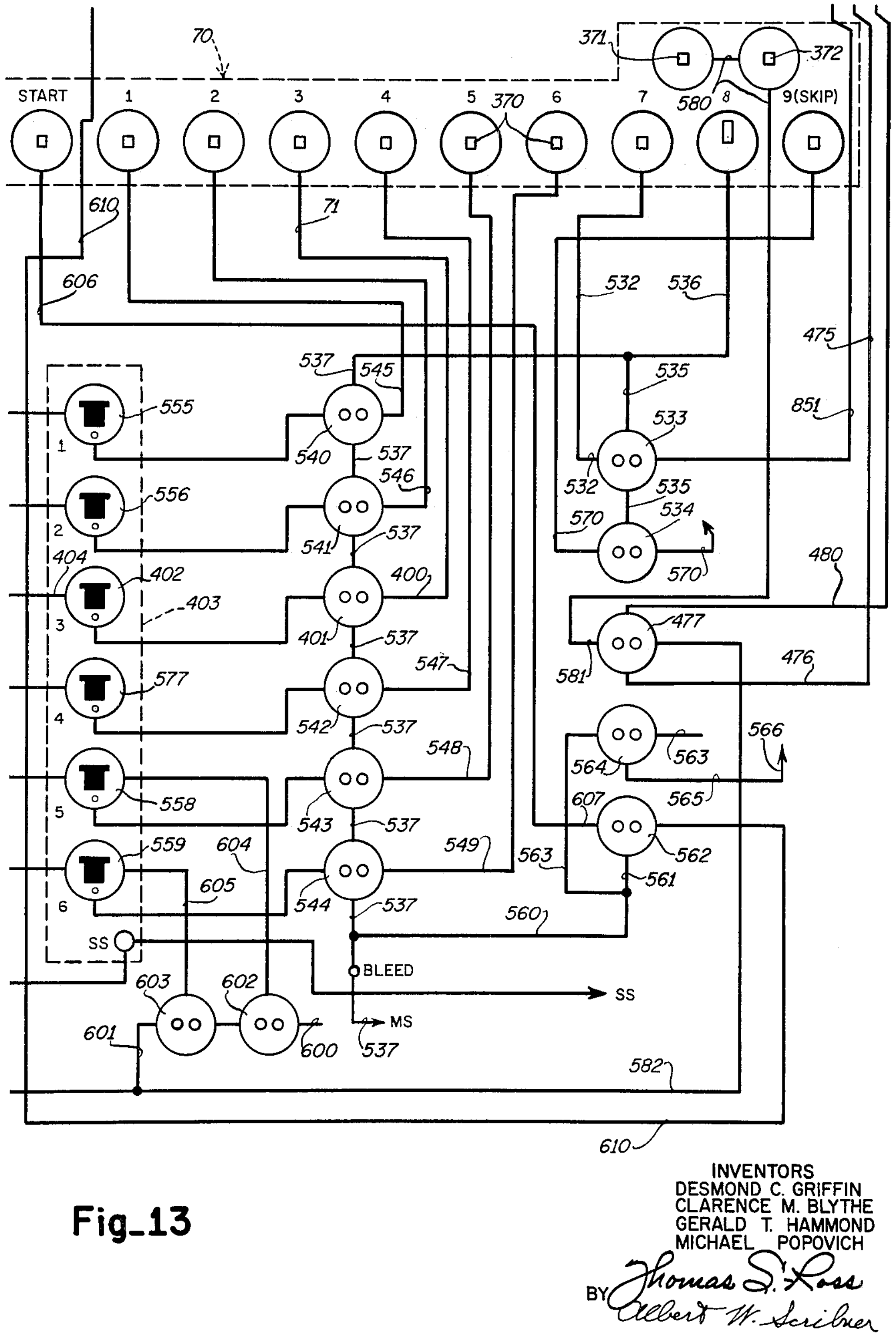

As previously mentioned the primary purpose of the above described interlocking pneumatic circuit for the valve assembly 135, FIGURE 9, is to control the timing and interrelation of the operation of the various record feed drive means illustrated in FIGURE 2. This control valve assembly 135 is connected to various other parts of the general circuitry as will now be described. The control line 851 of the secondary valve 522, FIGURE 9, is connected through the flow lines 532 of a blocking valve 533, FIGURE 13, to the 7 hole of the record reading head or tracker bar 70. The blocking valve 533 and a blocking valve 534 have a common control line 535 which is connected through a line 536 to the elongated number 8 hole of the tracker bar 70. The line 536 is further connected to the common control line 537 for the six blocking valves 540, 541, 401, 542, 543 and 544 and to the main supply as indicated by the letters MS. The flow lines 545, 546, 400, 547, 548 and 549 of the said six blocking valves are respectively connected to the 1, 2, 3, 4, 5 and 6 holes of the tracker bar 70 and also to the respective control lines of the six secondary valves 555, 556, 402, 557, 558 and 559; these six secondary valves controlling the above described six horizontal rows of blocking valves of the decoder 134. A line 560 is connected from said common blocking valve control line 537 to the control line 561 of a blocking valve 562 and to the flow lines 563 of a blocking valve 564. The control line 565 of valve 564 is connected to the port 212 of the main control switch 206, FIGURE 11, by a line 566, parts of which are shown in FIGURES 9 and 13. A line 567, FIGURE 9, connects line 566 with the control line of the blocking valve 502. The flow line 570 of the blocking valve 534, FIGURE 13, is connected to the 9 hole of the tracker bar 70. Flow line 570 is also connected to the flow lines 571, FIGURE 6, of a blocking valve 572 having a control line 573 which is connected to the punch supply. The flow lines 571 of valve 572 are also connected to said flow line 245 and to the control line 574 of secondary valve 575 in the punch unit. The output line 576 of valve 575 is adapted to operate the punch bellows 46 for the number 9 skip code hole. The two special holes 371 and 372 provided in the tracker bar are actually located at the extreme ends of the tracker bar as indicated in FIGURE 2 but are shown adjacent to each other in FIGURE 13 of the circuit diagram in order to promote clarity. These two holes are connected by a common line 580 which is connected through the flow lines 581 of the blocking valve 577 to a control line 582, FIGURES 13, 12, 7 and 8, which is connected to the eject pouch actuator 583 of the signal booster valve assembly 355, FIGURE 8. The impulse valve 584 which is operated by the pouch actuator 583 has two output lines 585 and 586, line 585 being connected to the on control line 484 of the eject on-off valve 483, FIGURE 9. The serially connected flow lines 600 and 601 of the blocking valves 602 and 603 are also connected to said control line 582. The control lines 604 and 605 of valves 602 and 603 are connected to the respective output lines for the #5 and #6 hole secondary valves 558 and 559. The start hole of the tracker 70 is connected by a line 606 to the flow lines 607 of the blocking valve 562 said lines 607 in turn being connected to a line 610. Line 610 is connected to the control line 611 of the start pouch actuator 612, FIGURE 8, of the booster valve assembly 355. The impulse valve 613 which is operated by the pouch actuator 612 has two output lines 614 and 615, line 614 being connected to the flow lines 440 of the blocking valve 441, FIGURE 9, while the other output line 615 is connected to the control line 485 of the eject on-off valve 483, FIGURE 9.

The reader record feed control valve assembly 135, FIGURE 9, is capable of being controlled from the record or tracker bar in a manner similar to that just described for the start code and may also be controlled either by the output from one of the blocking valves of the decoder, or manually from the control panel 136, FIGURE 11. For example, flow lines 620 of the decoder blocking valve I–3 are connected by a line not shown to a line 621, FIGURE 8, that is in turn connected to the control line 622 of a stop pouch actuator 623, FIGURE 8, of the booster valve assembly 355. The impulse valve 624 operated by said pouch actuator 623 has two output lines 625 and 626, line 625 being connected to the said output line 586. Line 586 is connected to a line 627 which in turn is connected to the off control line 437, FIGURE 9, of the start-stop on-off valve 435, FIGURE 9. The other output line 626 of the impulse valve 624, FIGURE 8, is connected to lines 615 and 485 which control the eject on-off valve 483. These same control lines 582, 611 and 622, FIGURE 8, for the pouch actuators 583, 612 and 623 respectively, may be controlled from the control panel 136. Here the lowermost start impulse valve 630, FIGURE 11, of the right hand reader column of manually operable impulse valves is connected by a line 631 to said line 610 which in turn is connected to the said pouch actuator control line 611. The next to the bottom stop impulse valve 632 is connected by a line 633 to said line 621 which in turn is connected to said stop pouch actuator control line 622. The eject impulse valve 635 has two output lines 636 and 637; line 636 being connected directly to the line 582 for the control line of the eject pouch actuator 583 while the line 637, FIGURES 11, 7, 8 and 9 is connected to the control line 503 for selector supply primary valve 504, FIGURE 9.

The other manually operable impulse valves of the control panel 136 have connections which will now be described. The manually operable delete impulse valve 650 has an output line 651 which is connected to the control line 216 of the punch supply control valve 203. The auxiliary stop impulse valve 663 is connected by line 664 to the control line 665 of the on-off valve 665. The select impulse valve 667 has an output line 670 that is connected to the control line 671 of an on-off valve 672 of said valve assembly 662. The off impulse valve 673 has four output lines 674, 675, 676, and 677, lines 675, 676 and 677 being respectively connected to the control lines 681, 682 and 683 of said on-off valves 666, 672 and 661, while line 674 is connected to the control line 684 of the fourth on-off valve 685 of said valve assembly 662, FIGURE 7. The output line 686 from the on-off valve 685 is connected by a line 687 to the port 211 of the main pneumatic control switch 206 on the control panel 136, port 211 being operatively connected to port 210 during a reading operation.

There are four special codes, namely the A–2 (punch unit on), A–1 (punch unit off), H–5 (select), and H–6 (auxiliary stop) which may be perforated during a punch operation by the manual operation of the respective impulse valves 260, 261, 262 and 263 of the control panel 136, FIGURE 11. During a subsequent reading and/or record reproducing operation these four special function codes may be used to operate certain punch controls and reader record feed controls as will now be described. The blocking valve A–2 of the decoder is connected by a line 700 partially shown in FIGURE 8 to the punch actuator 701 of the booster valve assembly 355. The pouch actuator 701 is adapted to operate an impulse valve 702 which has three output lines 703, 704 and 705, line 704 being conntected to said common control line 360. The A–1 blocking valve of decoder 134 is connected by a line 710 partially shown in FIGURE 8 to a pouch actuator 711 of said valve assembly 355. Pouch actuator 711 is adapted to operate an impulse valve 712 having output lines 713, 714 and 715, line 714 being connected to said common line 360. The blocking valve H–5 of said decoder 134 is connected by a line 716, partially shown in FIGURE 8, to a pouch actuator 717 of the valve assembly 355. The pouch actuator is adapted to operate an impulse valve 720 having three output lines 721, 722 and 723, line 722 being connected to said common line 360. The blocking valve H–6 of the decoder 134 is connected by a line 730, partially shown in FIG- URE 8, to a pouch actuator 731 of said valve assembly 360. The pouch actuator 731 is adapted to operate an impulse valve 732 having three output lines 733, 734 and 735, line 733 being connected to said common line 360. The output lines of the impulse valves 702, 712, 720 and 732 of the valve assembly 355, FIGURE 8, are connected to a special blocking valve network, 750 FIGURE 8, the nature of which will now be explained.

The symbols for the various blocking valves of the valve network 750 have been made slightly different for the sake of clarity and convenience; here the flow lines of the blocking valves connect with the small circles inside each of the larger valve designating circles while the valve control lines connect with the said larger circles. Each blocking valve symbol has within its circle the letter designations SP, SR, RPS or PS. Valves having the letters SP and SR have control lines which are connected to a sub-atmospheric pressure line when the main switch is in punch and reader positions SP and SR respectively. In similar fashion any valves having the letters PS has its control line connected to the punch supply while the valves having the letters RPS are connected to the said reverse punch supply line 463; FIGURE 9. When the valves marked PS are open the valves marked RPS will be closed, and vice versa. The said impulse valve output line 703 is connected to a flow line 751 of a blocking valve 754 whose other flow line 755 is connected to the flow line 756 of a blocking valve 757. The other flow line 760 of valve 757 is connected to the control line 761 of said punch supply on-off valve 685, FIGURE 7. The other output line 705 of said impulse valve 702, FIGURE 8, is connected to the flow line 762 of a blocking valve 763 whose other flow line 764 is connected by a line not shown to the secondary valve associated with number two code hole bellows of the punch unit. The output line 713 of impulse valve 712 is connected to a flow line 770 of a blocking valve 771 whose other flow line 772 together with the flow line 773 is connected to a line 774. Line 774 is connected by a line not shown to the secondary valve 226 associated with the A hole code bellows 46' of the punch unit. The flow line 770 of valve 771 is connected to a flow line 775 of blocking valve 776 whose other flow line 777 is connected to said control line 684 of said punch supply on-off valve 685. The output line 715 from said impulse valve 712, FIGURE 8, is connected to a flow line 780 of a blocking valve 781 whose other flow line 782 is connected by a line not shown to the secondary valve associated with the number 1 code hole bellows of the punch unit. The output line 721 of said impulse valve 720 is connected to a flow line 800 of a blocking valve 801 whose other flow line is connected to a flow line 802 of a blocking valve 803. The other flow line 804 of blocking valve 803 is connected to the output line 530 of said impulse valve 527, FIGURE 10. Line 804 is also connected to a line 805, FIGURE 8, which is connected to said line 627. The flow line 800 is also connected to a flow line 806 of a blocking valve 807 whose other flow line 810 is connected by a line not shown to the secondary valve associated with the number 5 code hole bellows of the punch unit. The output line 723 of the impulse valve 720, FIGURE 8, is connected first to the flow line 811 of a blocking valve 812 and secondary to the flow line 813 of a blocking valve 814 whose other output line 815 is connected to the flow line 816 of a blocking valve 817. The other flow line 820 of valve 817 is connected to the control line 484 of the eject on-off valve 483, FIGURE 9. The output line 734 of the impulse valve 732 is connected to the flow line 825 of a blocking valve 826 whose flow line 927 together with the flow line 930 of blocking valve 812 is connected to a line 831 that is in turn connected by a line not shown to the secondary valve ascociated with the H code hole bellows of the punch unit. The flow line 825 of valve 826 is also connected to the flow line 832 of a blocking valve 833 whose other flow line 834 is connected to the flow line 835 of a blocking valve 836. The other flow line 837 of valve 836 is connected through line 621 to the control line 622 of the said stop pouch actuator 623. The output line 735 of the impulse valve 732 is connected by a line not shown to the secondary valve associated with the number 6 code hole bellows of the punch unit.

Figure 7:
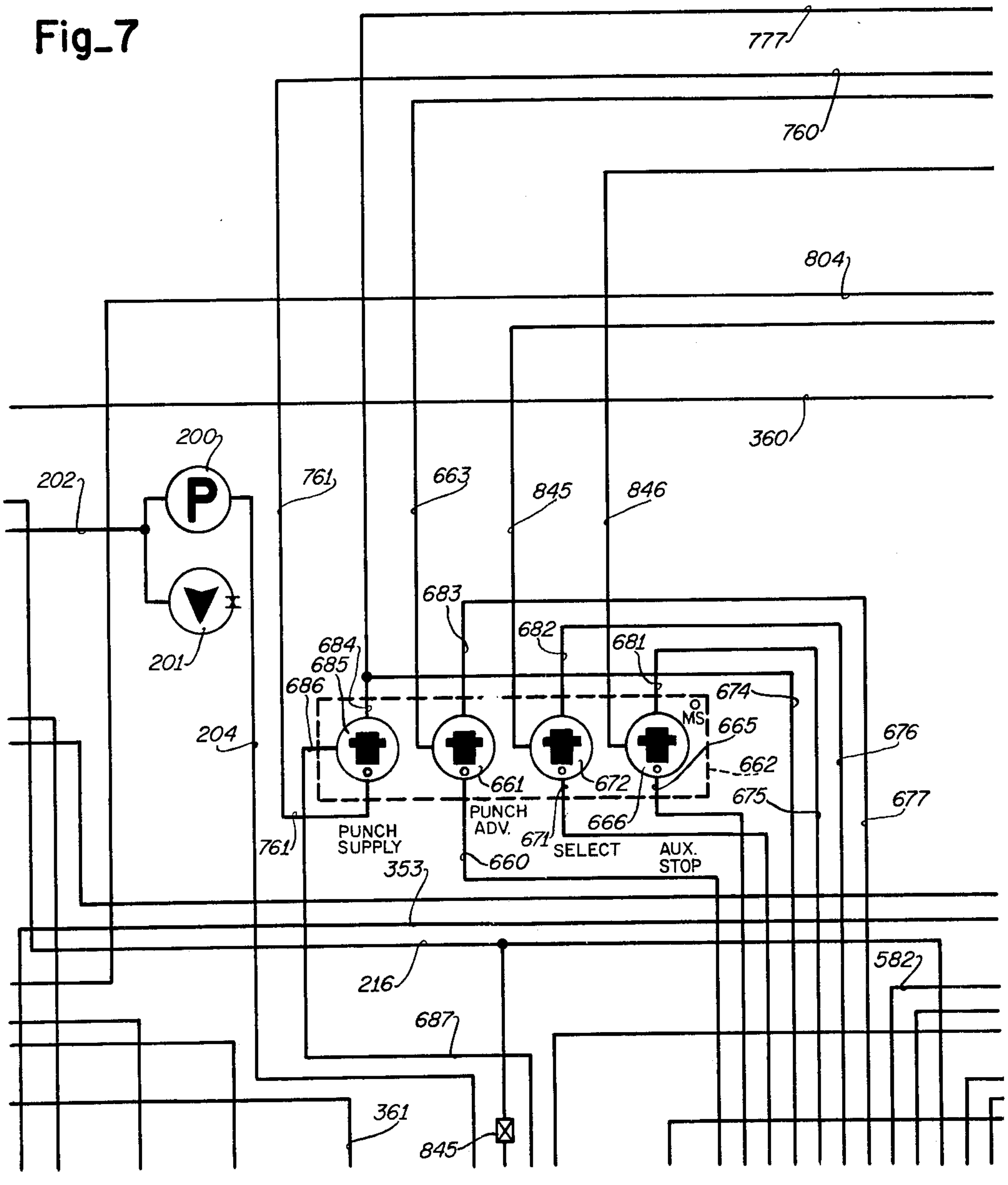
Figure 8:
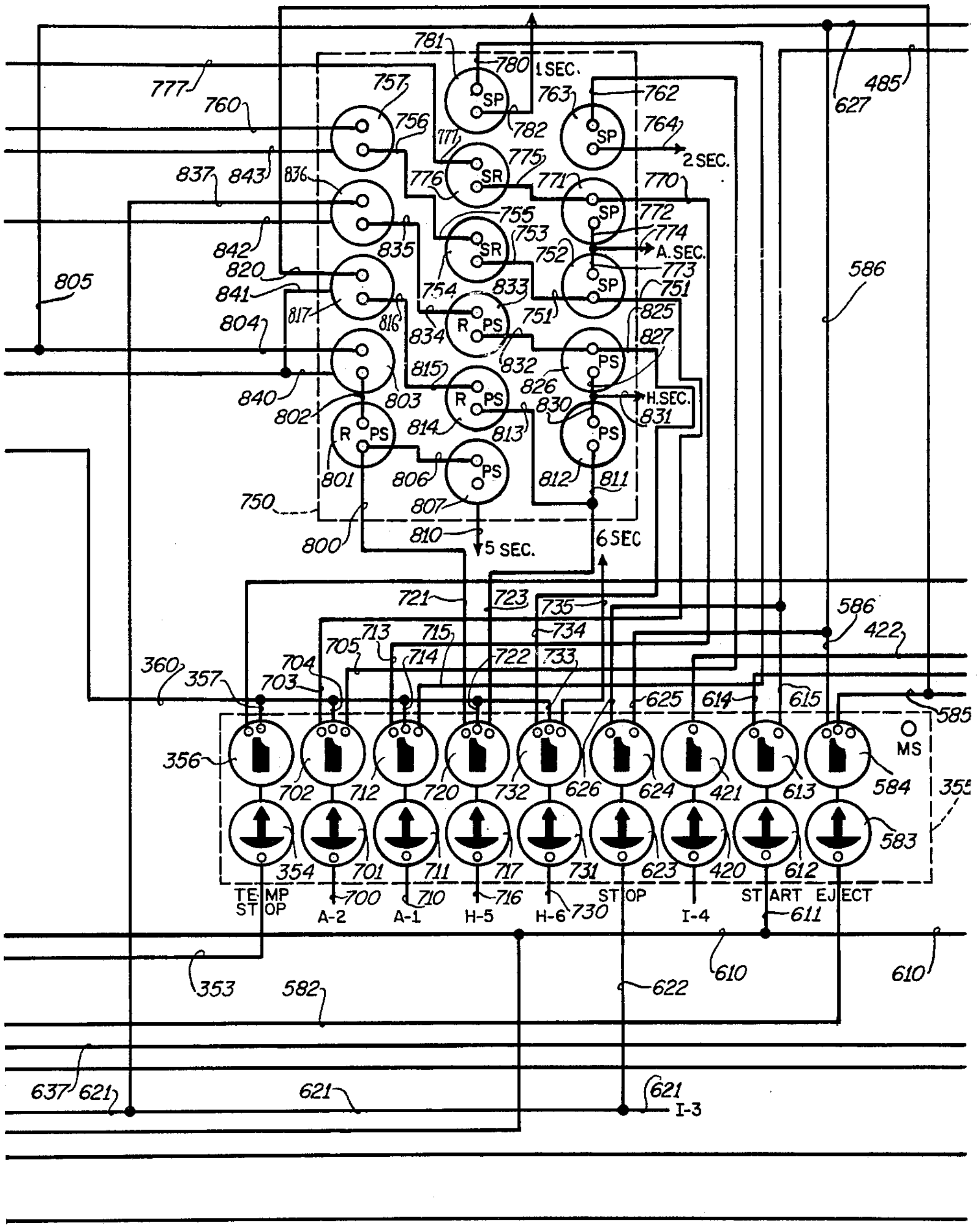

The four blocking valves 803, 817, 836 and 757 of the blocking valve network 750, FIGURE 8, have control lines 840, 841, 842 and 843 respectively, lines 840 and 841 being connected to the output line 845 of the select on-off valve 672, FIGURE 7, line 842 being connected to the output line 846 of said auxiliary stop on-off valve 666, FIGURE 7, and line 843 being connected to the output line 663 of said on-off valve 661, FIGURE 7. The on-off valve assembly 662, FIGURE 7, and the blocking valve network 750, FIGURE 8 are provided so that when conditioned during a record reading operation several program controls are obtainable as will be explained below. As was noted above the control panel 136 of the instant apparatus is provided with a first vertical column of manually operable impulse valves 260–268 which are associated with record punching operations. All of these valves are operative when the main switch 206 is in a punch position SP or when the punch on code A–2 is effective when the switch is in the reader position SR. The second vertical column of manually operable impulses valves 653, 655, 663, 667, 673, 635, 650, 632 and 630 of control panel 136 are associated with the record reading operations. Here the start stop, eject and unshift impulse valves are operative when the main switch is in either the punch or reader positions SP or SR, while the advance punch, auxiliary stop, select and off impulse valves are operative only when the main switch 206 is in a reader position SR. When the main switch is in a central correct position SC none of the punch control impulse valves 260–268 are operative and only the start, stop and eject valves on the reader side of the panel are operative.

An explanation was previously made as to the operation of the punch unit, i.e. a description was made for an exemplary record punching and feeding operation. A description will now be made for an examplary record reading and feeding operation with particular emphasis on the record feeding aspects of the operation. The main switch handle 207 is first moved to a reader position SR whereby the valves marked SR in the blocking valve network 750, FIGURE 8, will be opened. The main pressure supply MS at this time is or may be available to the on-off valve assembly 662, FIGURE 7, the signal booster valve assembly 355, FIGURE 8, the record feed interlock control valve assembly 135, FIGURE 9, to the line 537, FIGURE 13, punch supply valve 203 (FIGURE 6), and the main switch 206, FIGURE 11. The selector supply primary valve 504, FIGURE 9, will provide a sub-atmospheric pressure supply SS through line 510 to the typewriter actuating selector unit 133, FIGURE 12, and to the various other lines and valve assemblies marked with the letters SS. The punch supply (PS) is not on at this time so that a sub-atmospheric pressure will exist in the reverse punch supply (RPS) line, FIGURE 9, and the RPS line 846, FIGURE 6, connected thereto by a line not shown. When no record is on the tracker bar 70 the open number 8 hole in said tracker bar allows atmospheric pressure to exist in the line 536 which in turn closes the six blocking valves 540, 541, 401, 542, 543 and 544, FIGURE 13, thereby disabling the decoder 134. The atmospheric pressure in line 536 also closes blocking valves 533 and 534.

Before continuing with the explanation of the record reading operation, a description of the normal condition of the valves in the record feed control valve assembly 135 will be made. In that the punch supply is not now turned on an atmospheric pressure will exist in the control line 453 of the secondary valve 454 thereby causing a sub-atmospheric pressure to normally exist in the valve output line 455 which thereby opens blocking valves 431 and 444. Thus air may flow through flow lines 430 of the open blocking valve 431 so as to expand the slow punch speed bellows 100. Air also may flow from the normally off start-stop on-off valve through the flow lines 443 of said open blocking valve 444 so as to expand the medium read speed bellows 97. The normal atmospheric pressure in the line 452 connected to said control line 453 of the secondary valve 454 will cause blocking valves 433 and 447 to be closed. As noted above when the bellows 97 and 100 are in their expanded conditions they will respectively hold the impulse valves 101 and 102 open. The normally open impulse valve 101 will thus permit an atmospheric pressure to exist in the flow lines of the normally open blocking valve 462 and this will maintain the secondary valve 471 on which causes a sub-atmospheric pressure to exist in lines 472 and 473. Under these conditions the blocking valve 474 will normally be open thereby permitting air from the normally on eject on-off valve 483 to flow through this open blocking valve 474 to expand the eject bellows 96. The secondary valve 517 is normally off thereby permitting atmospheric pressure to exist in the output line 520 so as to normally maintain the temporary stop bellows 80 expanded and the friction drive rolls 74, 75, FIGURE 2 in mutual driving engagement. In similar fashion the normally off secondary valve 522 normally maintains an atmospheric pressure in the output 523 so as to expand the momentary stop bellows 151. It will thus be seen that all of the record feed control bellows 80, 96, 97, 100 and 151 are normally in their expanded conditions and none of the mechanical driving connections are operative to advance a perforated record.

After a perforated record is placed over the tracker bar and is threaded between the feed rolls 74, 75, FIGURE 2, the start impulse valve 630 of the reader control panel is manually operated. This causes an atmospheric pulse to pass through line 631, 610 and 611 so as to operate the signal booster valve combination 612, 613 which initiates an atmospheric pulse which passes through lines 614, 440 and 436 so as to turn the start-stop on-off valve 435 on and thus introduce a sub-atmospheric pressure in the output lines 434 and 442. In that the blocking 433 is now closed the bellows 100 will not be effected by the sub-atmospheric pressure in lines 434 and 432, however blocking valve 444 is open and the sub-atmospheric pressure in the valve output line 442 will, through lines 443 and 445, collapse the read speed bellows 97 and will keep the latter collapsed until the said sub-atmospheric pressure in line 445 is cut off. When the bellows 97 is collapsed the gear train 83 is in an operative condition and the feed rolls 74, 75 will be driven so as to continuously pull the perforated record 72 over the tracker bar 70 as indicated by the arrow 73 of FIGURE 2. As the record moves over the tracker bar the successive codes will be pneumatically sensed and the typewriter will be operated in response thereto in the manner explained above. When the bellows 97 is collapsed so as to drive the record feed rolls at medium read speed the impulse valve 101 will be closed thereby closing the control line 470 to the secondary valve 471 which thus closes the blocking valve 474. As long as valve 474 is closed the eject speed bellows 96 cannot be operated. In similar fashion as long as the blocking valve 431 is held open by the operation of the secondary valve 454 the slow punch speed bellows 100 cannot be collapsed. This pneumatic interlock will prevent the advertant or inadvertant operation of either the high or slow speed bellows 96 and 100 while the medium speed control bellows 97 maintains the record drive means at read speeds. It will be noted that when the said start signal booster valve combination 612, 613, FIGURE 8, is operated an atmospheric pulse is also initiated in the output line 615 which through line 485 will turn the high speed eject on-off valve 483 off if it happened to be that the eject speed drive was operative at the time that the just described read speed record feed is called for.

When it is desired to stop the reading operation the stop impulse valve 632 of the reader conrol panel is manually operated so as to initiate an atmospheric pulse in the line 633 which through lines 621 and 622 operates the signal booster valve combination 623, 624, FIGURE 8, which initiates an atmospheric pressure pulse in each of the output lines 625 and 626. The pulse in line 625, through lines 586, 627 and 437 serves to turn the start-stop valve 435 off and the latter allows air to pass through lines 442, 443, and 445 so as to expand the read speed bellows 97 and thus disenage the record feed drive train 83. In this way all the pneumatic circuits of the feed control interlock valve assembly 135, FIGURE 9, are restored to their said normal conditions and the feeding of the record ceases thereby also stopping the automatic operation of the typewriter.

If at any time an eject or rapid non-reading forward drive of the record is desired then the eject impulse valve 635 of the reader control panel, FIGURE 11, is manually operated so as to initiate an atmospheric impulse in each of the associated lines 636 and 637; the pulse in line 636 will, through line 582 operate the signal boosting valve combination 583, 584 so as to initiate atmospheric pulses in the associated lines 585 and 586. The pulse in line 585 will through line 486 turn the eject on-off valve 483 on while the pulse in line 586 will, through lines 627 and 437 turn the start-stop valve 435 off if the record is being driven at read speed at the time an eject speed is called for, this operation of valve 435 serving to expand bellows 97 to thereby disengage the read speed gear train 83, FIGURE 2. This expansion of the eject speed bellows 97 will open the impulse valve 101 and initiate an atmospheric implse in lines 465 and 470 thus operating the secondary valve 471 and creating a sub-atmospheric pressure in lines 472 and 473 thereby opening the blocking valve 474. Blocking valve 474 thus being opened allows sub-atmospheric pressure from the eject on-off valve 483 through lines 482 and 475 to collapse the eject speed bellows 96.

It will be noted that when the eject on-off valve 483 is on the blocking valve 491 will be opened and the atmospheric pressure in the associated valve flow lines 511 and 512 will serve to close the blocking valve 441 which will prevent a subsequent operation of the start-stop on-off valve 435 for effecting a read speed drive engagement until after the eject speed drive has been disengaged. In that the typewriter should not be operated during the fast or eject speed advance of the record the pneumatic record reading circuit is disabled as follows. The pressure impulse in the other line 637 of the manually operated eject valve 635, will, through lines 637 and 503, operate the primary valve 504, FIGURE 9, and in doing so will cause an atmospheric pressure to exist in the associated output line 510. This output line provides the sub-atmospheric pressure supply SS for the typewriter actuating selector unit 133, FIGURE 12, and related valve assemblies also marked with the letters SS, and hence when the valve 504 is operated in response to the above described initiation of the eject speed drive for the record, the selector supply pressure SS is cut off and the automatic operation of the typewriter under control of the record sensing means will be interrupted for as long as the eject speed record feed operation continues. The selector supply is here maintained off due to a pressure pulse through blocking valve 490 and line 500, said blocking valve 490 being held open through lines 487 and 486 by the eject on-off valve 483. When it is desired to stop the eject feed operation the stop impulse valve 632 of the reader control panel is again manually operated so as to initiate an atmospheric pulse in the line 633 which through lines 621 and 622 operates the signal booster valve combination 623, 624 so as to initiate atmospheric pulses in both the associated lines 625 and 626. As explained above these two pulses will turn off both the eject and start-stop valves 435 and 483, the eject valve 483 in this case now allowing the bellows 96 to expand thereby disengaging the eject speed gear train 82, FIGURE 2, for the record drive rolls 74 and 75 and hence again stopping the feeding of the perforated record. After so stopping the eject speed operation the circuits of the feed interlock valve assembly 135 will be in said normal conditions and the record reading circuit for controlling the operation of the typewriter will again be enabled.

The above described manually controlled eject operations for the reader record feed drive means may be controlled automatically by the reading of a corresponding eject code from the perforated record. Here when a 5–6 code is sensed by the tracker bar 70 the two secondary valves 558 and 559, FIGURE 13, associated with the number 5 and 6 tracker bar holes will be operated and will thereby open the two blocking valves 602, 603. An atmospheric pulse of air may then pass through lines 600, 601, 582 so as to operate said signal booster valve combination 583, 584 which turns the start-stop valve 435 off and turns the eject valve 483 on so as to initiate an eject speed operation of the record feed drive means as above described. The record drive can be automatically returned to read speed by the sensing of a start hole code at the tracker bar 70. Atmospheric pressure entering the tracker bar start hole will, through lines 606, 607, 610 and 611, operate the signal booster valve combination 612, 613 so as to initiate atmospheric impulses in lines 614 and 615. Atmospheric pressure in line 615 through line 485 will turn the eject speed on-off valve 483 thereby allowing atmospheric pressure to flow through line 482, 475 opening the eject speed bellows 96 at the same time and in the same manner as atmospheric pressure in line 486 and 488 closes blocking valve 491. A small bleed opening in blocking valve 441 can then create sub-atmospheric pressure in line 512 thereby opening valve 441. The atmospheric pulse in line 614 flows through the line 436 to turn on the start-stop valve 435 thus collapsing the read speed bellows 97 as explained above. In similar fashion when an I–3 stop code is pneumatically sensed at the tracker bar the I–3 blocking valve of the decoder 134, FIGURE 12, is operated and the pressure impulse initiated in the associated line 620 will, through line 621, FIGURE 8, operate thes aid stop signal booster valve combination 623, 624 and the read or eject record feed drive will be interrupted in the same manner as is above described in connection with the manually controlled stop operations.

If at any time during record reading operations it is found that the typewriter is in an upper case condition and the typewriter should be in a lower case condition, the unshift impulse valve 653 of the control panel may be manually operated so that an atmospheric pressure impulse is initiated in the lines 654 and 430 which will, through line 430*a*, operate to turn the shift valve 424, FIGURE 9, which in turn will through the associated output line 425 restore the shift key puller or pouch actuator, FIGURE 12, to a normal position whereby the typewriter is conditioned for lower case typing. The case shift operation and the above described unshift operation may be automatically controlled by I–4 and I–2 codes respectively that may be perforated in the record. Whenever the record eject feed drive 82 is engaged by turning the eject valve 483, FIGURE 9, on the typewriter is unshifted as follows. The sub-atmospheric pressure in output line 486 of valve 483 serves through line 489 to open the blocking valve 492 which then will permit air to flow through lines 513 and 431 so as to turn the shift valve 424 on thereby through the associated output line 425 unshifting the typewriter to lower case.

If for any reason it is desired to make a new record having the same data punched therein, the instant system may be conditioned and used to automatically produce such a new record. Here the new record is operatively positioned in the punch unit and the original record is operatively positioned in the reader unit as usual, but now the main switch 206 is placed in the punch position SP so as to enable the punch unit. Thereafter the reader start impulse valve 630 of the control panel 136 may be manually operated (the start, stop and eject valves for the reader unit are operative when the main switch is in any of its 3 positions SP, SR or SC) and the original record will be read and will operate the typewriter in the manner described above. Here however in that the main switch being in the punch poistion SR has now turned on the punch supply pressure the punch unit will be operated in response to the operation of the typewirter and hence a new record will be made which is the same as the original record that is controlling the operation of the typewriter. When the punch unit is being thus operated during a reading operation the record feed speed for the reader unit must be slowed down so as to permit sufficient time to properly effect the successive punch cycles. This is accomplished as follows. When the punch supply (PS) is turned on a sub-atmospheric pressure will be supplied to lines 453, 452, 451 and 450, FIGURE 9, which will open blocking valves 433 and 447 and which through secondary valve 454 will close blocking valves 431 and 444. This will permit air to flow through lines 446 and 445 so as to expand bellows 97 and thereby disengage the medium read speed gear train 83 for the record reader. Opening of the blocking valve 433 will allow the sub-atmospheric pressure from the now on valve 435 to flow through line 432, the now open blocking valve 433 and line 429 so as to collapse the slow punch speed bellows 100 whereby gear train 84, FIGURE 2, is operatively engaged so that the record is fed through the reader unit at relatively slow speeds. The sub-atmospheric pressure from output line 442 of the start-stop on-off valve 435 cannot collapse bellows 97 because blocking valve 444 is now closed. When the bellows 100 is thus collapsed the impulse valve 102 associated therewith is closed and thus a sub-atmospheric pressure may exist in the line 466 of the now open blocking valve 467 thereby retaining the secondary valve in normal condition which in turn serves to allow the blocking valve 474 to remain closed thus preventing any accidental operation of the eject speed bellows which would cause a gear clash. Thus only the punch speed bellows 97 is inoperative when the punch unit is being operated. In this manner the original record is continuously fed through the reader at relatively slow speeds which will give each punch cycle of operation time to be properly completed before the next punch cycle is initiated. This record duplicating operation is permitted to continue until the new record has duplicated the original record being read.

It should be noted that when the punch pressure supply PS is cut off after the record duplicating or other operation an atmospheric pressure will again exist in the said lines 453, 452, 451 and 450, FIGURE 9, whereby blocking valves 433 and 447 will close and blocking valves 431 and 444 will open. This action will cause bellows 100 to expand and bellows 97 to collapse thereby disengaging the slow punch feed drive and re-engaging the read speed drive. It will be noted that due to the presence of the restriction in the flow lines for blocking valves 433 and 444 the expanding of either one of the bellows 97 or 100 occurs more quickly than the accompanying collapsing of the other bellows, thereby further insuring that one driving gear train is disengaged before the other driving gear train is engaged. These conditions of course exist any time a shift in the record feed drive means is made.

The instant data processing system has several special program functions which may be advantageously used. The first of these program functions is what will be referred to as a punch advance. In the instant system the operation of the record punch unit is adapted to be controlled by the operation of the typewriter when the main switch handle 207 is in the punch position SP. During read operations however operation of the typewriter cannot normally operate the record punch unit because when the main switch handle 207 is in the punch position SP. During read operations however operation of the typewirter cannot normally operate the record punch unit because when the main switch handle 207 is in the reader position SR there are no pneumatic pressure supply (PS) connections to the punch unit and hence the punch unit is disabled. Thus only the typewriter is normally operated in response to a record reading operation. There are many situations where it is desirable to have the punch unit operated at times by the typewriter during a record reading operation so that any desired perforated portion of the record being read may be reproduced or regenerated in a new tape. The instant pneumatic circuitry makes it possible to coordinate the operation of the punch unit with the operation of the typewriter and reader units as will now be described.

Let it be assumed that a record is being punched under the control of the manual operation of the typewriter Some predetermined parts or paragraphs of the data or message being punched in the record may be of a special character so that when the record is subsequently read it may be desired to reproduce this particular data by punching a second or new record. When the original record is being punched a punch on code A–2 is perforated in the record just before the beginning of each of said predetermined record parts and a punch off code A–1 is perforated in the record immediately after each of said parts of the record. These two codes A–2 and A–1 are punched in the record by manually operating the punch on and off impulse valves 260 and 261 respectively, FIGURE 11, of the control panel 136. These two codes in the record will then mean that if desired the data therebetween may be reproduced in the form of a new perforated record during any subsequent reading operation of the initial record. When such an initial record is being read (and the main switch is in the reader position SR) the reader valve network 750, FIGURE 8, is normally conditioned so that the punch on and punch off codes A–2, A–1 are ignored and the punch unit remains off. This condition prevails because the signals from the A–2 and A–1 decoder blocking valves operating through their associated valves of the signal booster assembly 355, FIGURE 8, cannot get through the related closed blocking valves 757 of the network 750 to operate the punch supply control on-off valve 685, FIGURE 7, the output line 686 from this valve 685 being adapted to control, through ports 211 and 210 of the main switch 206, the operation of the punch supply valve 203, FIGURE 6. Thus the punch unit is not enabled during a normal reading of said record. When it is desired to reproduce a new perforated record having therein the said predetermined parts of the initial record the reader is conditioned to be responsive to said A–2 and A–1 punch control codes. To so condition the reader the advance punch impulse valve 655 of the control panel is manually operated at the beginning of a record reading operation and the codes A–2 and A–1 when read will now turn the punch supply on and off so that when the said predetermined data in the original record between these two codes is read and typed in the usual manner the typewriter may operate the now enabled punch unit so as to appropriately perforate the new record. The circuit operation involved here is as follows. When the said reader conditioning punch advance impulse valve 655 of the control panel 136 is operated and an atmospheric impulse is initiated in the output lines 656 and 657, the pulse in line 657 serving to turn the on-off valve 661 on whereby the sub-atmospheric pressure in the output line 663 will through line 760 hold the blocking valve 757 of network 750 open. Under these conditions when the punch on code A–2 in the record is sensed the decoder blocking valve A–2 will initiate an atmospheric pulse in its associated output line which will operate the associated signal booster valve combination 701, 702 of the valve assembly 355 so that atmospheric pressure impulses are initiated in each of the two output lines 703 and 705. The pressure impulse in line 703 will pass through lines 751, 753 through the open blocking valve 754 lines 755, 756 and the now opened blocking valve 757 and through lines 760 and 761 to turn the punch supply control valve 685 on. With this valve on a sub-atmospheric pressure will exist in the output line 686 which, through line 687, the now connected ports 210 and 211 of the main switch, and the lines 215 and 216 will turn on the punch supply valve 203, FIGURE 6. Thus as a result of reading the punch on A–2 code in the record the punch pressure supply will be turned on and thus any codes subsequently read from the record will not only operate the typewriter but will permit the punch unit to be operated under the control of the typewriter, so as to reproduce the desired portion of the original record or any new data which might be inserted manually from the typewriter keyboard. When the punch unit is being thus operated during a reading operation the record feed speed for the reader unit must be slowed down so as to permit sufficient time to properly effect the successive punch cycles and this is automatically accomplished in the manner described above in connnection with the duplication or reproduction of the entire record.

When the reader has come to the end of the said predetermined part of the data in the record the punch off code A–1 will be sensed which will serve to cut off the pressure supply to the punch unit so that the codes thereafter sensed in the record still operate the typewriter but are not reproduced in the new record. This circuit action is accomplished as follows. When the punch off code A–1 operates the A–1 blocking valve of the decoder 134, FIGURE 12, the resultant atmospheric impulse in its associated output line will operate the valve combination 711, 712 of the signal booster valve assembly 355, FIGURE 8. An atmospheric pressure pulse will thereby be initiated in each of the associated output lines 713 and 715. The pulse in line 713 will pass through lines 770, 771, the now open blocking valve 776, lines 777 and 684 to thereby turn the punch supply control valve 685 off thereby disabling the punch unit. When the record reproducing operation is thus terminated by reading the A–1 code the record feed for the reader unit need not continue at slow punch accommodating speeds and is here automatically switched back to the high read speeds. This is accomplished as follows. When the punch pressure supply PS is cut off an atmospheric pressure will again exist in the lines 453, 452, 451 and 450 whereby blocking valves 433 and 447 will close and blocking valves 431 and 444 will open. This action will cause bellows 100 to expand and bellows 97 to collapse thereby disengaging the slow punch feed drive and re-engaging the read speed drive. It will be again noted that due to the presence of the restriction in the flow lines for blocking valves 433 and 444 the expanding of one of the bellows 97 or 100 occurs faster than the accompanying collapsing of the other bellows, thereby insuring that one driving gear train is disengaged before the other driving gear train is engaged.

If and when the initial record is again read the A–2 and A–1 codes will turn the punch unit on and off at the appropriate times as above described. If and when it is desired to read the initial record and again ignore the punch on and off A–2 and A–1 codes the off impulse valve 673 of the control panel is manually operated so that the resultant atmospheric pressure impulse in the lines 677 and 683 turns the punch advance control valve 661 off which in turn will close the blocking valve 757 of the conditioning network 750 so that the punch supply control valve 685 cannot be turned on in response to the sensing of the punch on code A–2 while normal reading operations proceed in the usual manner above described.

It will be noted that during a reading operation wherein the reader is conditioned to be responsive to the A–2 and A–1 codes these codes will perform the function of turning the punch on and off but will not be reperforated in the new record by said punch. Here with the main switch 206 in the reader position SR the SP blocking valves 781, 763 and 771 of the valve network 750, FIGURE 8, will be closed thereby blocking the A–2 and A–1 signals to the secondary valves 226, etc. which control the A–2 and A–1 code hole bellows 46 of the punch unit. The opposite is true when a regular record reproducing operation is being carried out wherein the entire record is being duplicated as above described. Here the A–2 and A–1 codes will be reperforated in the new record but the punch on and off function is ignored otherwise the record duplicating operation would be interrupted when an A–1 punch off code was read. This latter condition is avoided in that during a record duplicating operation the main switch is in a punch position SP whereby the SR blocking valves 776 and 754 of the valve network 750, FIGURE 8, are closed thereby blocking any possible operation of the punch supply control valve 685, FIGURE 7. In that the said SP blocking valves 781, 763 and 771 of said network are open pressure impulses may pass therethrough thereby remaking the respective A–2 and A–1 codes for operating the secondary valves which control the A, 2 and 1 code hole bellows 46 of the punch unit.

Another special function which is capable of being carried out in the use of the instant data processing system is what will be referred to as an auxiliary stop. This function is used when during a regular record reading operation it is desired to interrupt the reading of the record at some predetermined point so that an insertion in the data being typed may be made by a manual operation of the typewriter. To this end an auxiliary stop code H–6 is initially perforated in the record at the point where the desired interruption in the record reading operation is to be made. This H–6 code is initially punched in the record by the manual operation of the auxiliary stop impulse valve 262 of the control panel 136, FIGURE 11. During a subsequent normal reading of the record this auxiliary stop code H–6 will be ignored for the following reasons. During the reading operation the main switch 206 will be in the reader position SR and when the H–6 code is sensed operation of the H–6 blocking valve of the decoder will through the valve combination 731, 732 FIGURE 8, cause an atmospheric impulse to be initiated in the associated output line 734 which may pass through lines 825 and 832, the now open RPS blocking valve 833 of network 750, FIGURE 8, but is blocked by the normally closed blocking valve 836 so as to prevent the impulse from flowing through lines 837, 621, 622 to operate record stop control valve combination 623, 624 which controls the operation of the start-stop record feed valve 435, FIGURE 9. Thus normally the H–6 code is ignored. When it is desired to have the record feed stopped by said H–6 code at said predetermined point during record reading operation the reader circuits are conditioned so as to be responsive to said auxiliary stop code. This action is accomplished as follows. The auxiliary stop impulse valve 663 of the control panel 136 is manually operated which through line 664 turns the on-off valve 666 on so that the resultant sub-atmospheric pressure in the associated output line 846 opens said blocking valve 836. Under these conditions when an auxiliary stop code H–6 is subsequently read the previously blocked pressure impulse in said lines 836 and 832 may pass through said blocking valve 836 so as to operate, through lines 836, 621, 622, the said booster valve combination 623, 624 whereby the resultant atmospheric pulse in line 625 acts to turn the start-stop valve 435 off. When this occurs the resultant atmospheric pressure in lines 442, 443 and 445 will permit the bellows 97 to expand thereby disengaging the record feed gear train 83 and stopping the record reading operation. At this point the typewriter may be manually operated to type the desired insertions into the typed record. After these typed insertions have been made and it is desired to continue with the record reading operation the start impulse valve 630 of the control panel 136 is manually operated so as to effectively turn on the said start-stop valve 435 so that the sub-atmospheric pressure in the output line 442 thereof can collapse the said bellows 97 in order to start the reader record feed drive 83. Thereafter the record reading operation will continue as before. When it is desired to have the record reading unit again functionally ignore an auxiliary stop code H–6 the off impulse valve 673 of the control panel 136 is manually operated so that the resultant atmospheric pressure impulse in line 675 turns the auxiliary stop valve 666 off. This of course will close the said blocking valve 836 of network 750, FIGURE 8, so that the said code H–6 is thereafter ineffective to stop the record feed drive for the reader as above described.

It will be noted that during a record duplicating operation the H-6 code may be reproduced but this auxiliary stop code cannot interrupt the normal operation of the record feed drive means for the record reader unit. This operational characteristic will exist because of the fact that during the record duplicating operation the main switch 206 will be in a punch position SP wherein the RPS blocking valve 833 of the network 750, FIGURE 8, will be closed thereby preventing the sensed H–6 code from operating the record feed start-stop control valve 435, FIGURE 9. The H–6 code will be reproduced during a record duplicating operation in that the main switch in being in the punch position SP will turn on the punch supply and hence the network PS blocking valve 826 will be opened so that when the H–6 code is sensed the resulting atmospheric pressure impulse initiated in the said lines 734 and 735 can operate the secondary valves which control the H and 6 code bellows of the punch unit thereby perforating this code in the new record.

Another special function which is capable of being carried out by the instant data processing system will be referred to as a select operation. This function is used during a record reading operation when a predetermined part of a record being sensed is desired to be selectively omitted from the typewritten record. This function is accomplished as follows. When the record is being initially made up a select code H–5 is punched in the record immediately before the predetermined part of the record which may be desired to be omitted. This is done by manually operating the select impulse valve 263 of the control panel 136. Also at least five start code holes are punched in the record immediately after said predetermined part of the record by manually operating the start impulse valve 268 of the control panel. When the record is subsequently read the reader unit will normally ignore the select H–5 codes. Here during the normal record reading operations the main switch 206 will be in a reader position SR and hence the RPS blocking valves 801 and 814 of the network 750, FIGURE 8, will be open. When an H–5 code operates the H–5 blocking valve of the decoder 134 the resultant atmospheric impulse in the associated output line 716 partially shown in FIGURE 8, will operate the valve combination 717, 720 of the booster valve assembly 355. An atmospheric pressure impulse will be thereby initiated in each of the output lines 721 and 723, the pulse in line 721 passing through the line 800, now open RPS blocking valve 801, and the line 802 but is blocked by the now closed blocking valve 803. The impulse in line 723 passes through line 813, the now open RPS blocking valve 814, lines 815 and 816 but is blocked by the now closed blocking valve 817. The punch supply PS not now being on the PS blocking valves 807 and 812 of said network will be closed thereby also respectively blocking the pressure impulses in said lines 721 and 723. Thus normally the H–5 code is not effective during a record reading operation. When it is desired to condition the reader to be responsive to the said H–5 and start codes so as to skip over said predetermined part of the record, the select impulse valve 667 of the control panel 136 is manually operated so as to initiate a pressure impulse in the line 670 whereby the select on-off valve 672 will be turned on. The resultant sub-atmospheric pressure in the output line 845 will open both of the blocking valves 803 and 817 of said network 750. Thus when the select H–5 code is subsequently read the resulting impulse from said line 721 will be permitted to pass through line 800, valve 801, blocking valve 803, and through lines 804, 805, 627 and 437 will turn the read speed drive control valve 435 off. This will expand bellows 97 and disengage the read speed gear train 83. Simultaneously the high speed eject record feed will become operative so that the portion of the record to be omitted may be rapidly skipped over. Here in that the blocking valve 817 is now open the impulse in said line 723 resulting from reading the H–5 code will be able to pass through said valve 817 and through lines 820 and 484 will turn the rapid effect speed control valve 483 on thereby collapsing the bellows 96 and engaging the gear train 82 to rapidly advance the record over said part of the record to be omitted. When the record feed drive for the reader is in rapid eject speed condition the selector supply valve 504, FIGURE 9, is operated and the pressure supply to the typewriter operating selector unit 133, FIGURE 12, is cut off thereby preventing typing during the rapid forward eject record feed operation. When the start code, which is located at the end of the data to be omitted, is read an atmospheric impulse through the tracker bar line 606, FIGURE 13, will pass through the blocking valve 562 (which is now held open because of being connected to the main supply MS) lines 610 and 611 to operate the valve combination 612, 613 of the booster valve assembly 355, FIGURE 8. The resultant atmospheric impulses in the associated output lines 614 and 615 will, as above described, serve to turn the rapid eject speed control valve 483 off and turn the read speed start control valve 435 on and also to operate said selector supply primary 504, FIGURE 9, so that it again affords a pressure supply for said selector unit 133 whereby the normal record reading operations may again commence. In this manner the predetermined portion of the perforated record will be omitted or skipped over as long as the reader circuit remains conditioned to be responsive to the H–5 select code.

When it is desired to read the record and not omit said predetermined portion of the record the off impulse valve 673 of the control panel 136, FIGURE 11, is manually operated to turn the select on-off valve 672 off thereby again closing both of the network blocking valves 804 and 817 and making the reader unit non-responsive to the H–5 code.

It will be noted that during a record duplicating operation the H–5 code may be reproduced but this select code cannot now interrupt the normal operation of the record feed drive means for the reader as before. This operational characteristic will exist in that during the reproducing operation the main switch will be in the punch position SP and the RPS blocking valves 801 and 814 will thus be closed thereby preventing the sensed H–5 code from effecting the record feed drive controls as before. Likewise during the duplicating operation the PS blocking valves 807 and 812 will be open thereby permitting the pressure impulses in lines 721 and 723 resulting from the sensing of an H–5 code to operate therethrough the secondary valves which control the H and 5 code hole bellows of the punch unit.

Certain other features of operation of the instant system will now be described. When a typist is making up a record and types a double character, i.e. two successive characters which are the same, a blank or tape feed space code, i.e. a number 9 code hole, should be punched between the double characters so that during a subsequent reading operation the continuously moving record being read will not call for the second one of the double character before the typewriter has mechanically completed the printing cycle for the first of said double characters. The number 9 code hole in the record thus serves primarily to afford a non-operating blank space between the successive double character codes. The number 9 code may be used in other similar situations where it is desired to delay the typing of the second of two particular characters such as where the type bars for two successive characters are mutually adjacent and clashing might occur if much overlap in their respective printing strokes was permited. If the typist forgets to insert the number 9 code hole where needed a substitute technique is possible here in order to obtain substantially the same results. Here the typist may manually punch a single additional number 7 code hole in the record in the same lateral code line as the first of the two character codes. When the record is subsequently read the number 7 hole will be sensed with the first of said character codes so that the reader record feed will be momentarily interrupted and then allowed to continue. This action flows from the operation of circuitry connected with the number 7 hole of the tracker bar 70. Referring to FIGURE 13 an atmospheric impulse initiated in the number 7 code hole line 532 will pass through the now open blocking valve 533 and through line 851 will operate the secondary valve 522 which in turn will collapse the bellows 151, FIGURES 3 and 9. Collapsing of bellows 151 will open impulse valve 157 and initiate a momentary atmospheric impulse in the output line 525 thereby, through line 515, valve 507 and line 516, operating the secondary valve 517. The resultant sub-atmospheric pressure in line 520 will momentarily collapse the temporary stop bellows 80 thus momentarily interrupting the record feed drive. If the number 7 hole is read during a record duplicating operation the record feed will be fully stopped. Here the punch supply pressure will be on and hence the pressure impulse in the output line 524 of the momentary stop impulse valve 157, FIGURE 9, will operate the valve combination 526 and 527, FIGURE 10, of the signal booster valve assembly 250. The resultant pressure impulse in the associated output line 530 will through lines 804, 805, 627, and 437 turn the start-stop valve 435 off and hence the resultant expanding of the read feed bellows 97 will disengage the record feed drive gear train 83 as above described. In this way the record duplicating operation will be stopped and a number 9 code hole, which had been omitted from the original record, may now be manually inserted in the new record by the operation of either the typewriter keyboard skip impulse valve 123, FIGURE 10, or the skip impulse valve 264 of the control panel 136, FIGURE 11.

When a typist is making up a record and makes an error she may manually operate the delete impulse valve 266 of the control panel 136 in order to punch a number 8 code hole immediately following the punched code which was erroneous. Here when this record is subsequently read the number 8 hole in the tracker bar, being elongated in a record upstream direction by an amount at least equal to the longitudinal pitch of the record codes, will sense the number 8 code hole in the record shortly before the erroneous code is sensed. The atmospheric impulse in the 8 hole tracker bar line 536, FIGURE 13, will close the blocking valves 540, 541, 401, 542, 543 and 544 thereby disabling the decoder 134, FIGURE 12, and will also close the blocking valves 533 and 534 thereby preventing the effective reading of a number 7 or 9 hole code. Thus when a number 8 hole code is sensed it renders the preceding code ineffective.

When a record duplicating operation is being performed it may be desired to delete a certain portion of the original record which may contain an error or other undesired codes. Here the reading operation may be stopped at the beginning of the undesired record section by operating the reader stop impulse valve 632 and the delete impulse valve 650 of the control panel 136 may thereafter be manually held in the operated condition while the undesired portion of the record is manually advanced over the tracker bar by manually rotating the tape feed knob 103, FIGURE 2. Under these conditions the punch supply pressure will be held off and only the typewriter is operated by the reader unit as the record is inched forward by said manual rotation of the knob 103. After the undesired section of the record has been manually advanced over the tracker bar the delete valve 650 is restored to normal condition and the start reader impulse valve 630 is operated so as to continue the record duplicating operation. In this way the new record will not have the said undesired section of the original record therein.

The purpose for the two special holes 371, 372, FIGURE 3 and 13, in the tracker bar is so that if a high speed non reading eject record feed operation is in progress when the physical end of the record passes over and off the tracker bar the eject speed drive will remain operatively engaged to continue the fast operation of the record feed drive means. This condition is desirable in certain applications where relatively short length individual records are to be successively read. Here as one record is moved out of the reader unit a high speed the high speed record drive remains engaged to rapidly feed in the next record to a start position. Also here in that the sub-atmospheric pressure supply to the tracker bar is cut off while the record drive means are operating at eject speeds such will facilitate the positioning of a new record on the tracker, i.e. if a vacuum existed at the tracker bar holes it could be difficult to manually push the leading end of the next record over the tracker bar in attempting to get said record leading end into the feed rolls 74, 75, FIGURE 2. This holding of the high speed eject drive in the engaged conditions is accomplished as follows. As the end of the rapidly moving record passed off the tracker bar the holes 371 and 372 (as well as all the other tracker bar holes) are uncovered resulting in atmospheric pressure being introduced into the lines 580, 581. This atmospheric pressure will pass through the blocking valve 477 (which is open during an eject speed record feed operation) and through lines 582 to continuously operate the eject valve combination 583, 584, FIGURE 8, which through lines 585 and 484 will maintain the eject control valve 483 in the on condition. Thus the eject speed bellows 96 are held in a collapsed condition to permit the eject speed drive means to continuously operate after the said record has left the tracker bar. This continuous operation of the eject speed feed will occur only if the record is in eject feed condition as the record moves off the tracker bar because this is the only operation which will hold the said blocking valve 477, FIGURE 13, open so as to make the atmospheric pressure from said special tracker bar holes 371 and 373 effective.

When it is desired to up date, correct or otherwise alter certain data in a perforated record the latter may be placed in the reader unit and a normal reading operation continued until the point in question is reached whereupon the reading operation is stopped in the usual manner. The main switch handle may then be moved to a correct position SC. In this correct position the switch ports 205 and 212 are connected whereby the resultant sub-atmospheric pressure in the switch line 852 and the line 566 will open the blocking valve 564, FIGURE 13, so that atmospheric pressure will exist in the associated lines 563 and 560. This atmospheric pressure will close the blocking valve 562 so as to effectively disable a start code from the tracker bar and through lines 560 and 537 will close the six decoder controlling blocking valves 540, 541, 401, 542, 543, and 544 to thereby disable the decoder 134. Thereafter the record feed may be manually advanced or backed up by the appropriate manipulation of the knob 103, FIGURE 2, and the manual covering up of certain holes and/or the manual punching of new holes in the record may be carried out without a simultaneous attempt by the apparatus to read and type the various record codes which might happen to pass over the tracker bar during the correction operations. The provision and use of this correction position and connections for the main switch 206 are primarily to allow the operator to visually follow the normal record reading operation and then to stop the operation and switch to a correct condition so that the local portions of the record that are to be corrected my be manually handled and manipulated without having to remove the record from the reader and without having to contend with the otherwise attempted reading operations of the adjacent sections of the record.

While there is in this application specifically described one form which the invention may assume in practice, it will be understood that this form of the same is shown for purposes of illustration only and that the invention may be modified and embodied in various other forms without departing from its spirit or the scope of the appended claims.

The invention claimed is:

1. In a pneumatically controlled data processing system having a typewriter with appropriate alphanumeric and function keys, said typewriter having an impulse valve associated with each of said keys and comprising part of a circuit including a vacuum supply, said impulse valve being openable to atmosphere upon depression of a typewriter key, said impulse valve having a pair of output ports for connection to atmosphere when said valve is opened by a typewriter key depression, a secondary valve having a control port connected to one of said impulse valve output ports, said secondary valve including an output port connectable to said vacuum supply upon operation of said secondary valve, a bellows connected to said secondary valve output port and operable to be collapsed when said secondary valve is connected to vacuum by an atmospheric pulse transmitted from said impulse valve in response to depression of said key, a punch connected to said bellows for record punching actuation thereby upon collapse thereof for punching a code hole in a record strip, a second secondary valve having an output port and a control port connected to the other of said impulse valve output ports, a second bellows connected to the output port of said second secondary valve and operable to be collapsed when said second secondary valve is connected to vacuum by an atmospheric pulse from said impulse valve, a second punch connected to said second bellows for punching actuation upon collapse thereof for punching another code hole in said record strip thereby to provide with said first mentioned code hole a readable punched code in said strip, and pneumatic means operatively associated with both of said secondary valves for expanding said bellows and retracting said punches after punching actuation thereof.

2. In a pneumatically controlled data processing system having a typewriter with appropriate alphanumeric and function keys, said typewriter having an impulse valve associated with each of said keys and comprising part of a circuit including a vacuum supply, said impulse valve being openable to atmosphere upon depression of a typewriter key, said impulse valve having a pair of output ports for connection to atmosphere when said valve is opened by a typewriter key depression, a secondary valve having a control port connected to one of said impulse valve output ports, said secondary valve including an output port connectable to said vacuum supply upon operation of said secondary valve, a bellows connected to said secondary valve output port and operable to be collapsed when said secondary valve is connected to vacuum by an atmospheric pulse transmitted from said impulse valve in response to depression of said key, a punch connected to said bellows for record punching actuation thereby upon collapse thereof for punching a code hole in a record strip, a second secondary valve having an output port and a control port connected to the other of said impulse valve output ports, a second bellows connected to the output port of said second secondary valve and operable to be collapsed when said second secondary valve is connected to vacuum by an atmospheric pulse from said impulse valve, a second punch connected to said second bellows for punching actuation upon collapse thereof for punching another code hole in said record strip thereby to provide with said first mentioned code hole a readable punched code in said strip, and pneumatic means operatively associated with both of said secondary valves for expanding said bellows and retracting said punches after punching actuation thereof, and manually operable means including pneumatic reader circuitry having a record reader tracker bar connectable to said first mentioned circuitry and accordingly to said punches for optionally connecting said reader circuitry to said typewriter or to said first mentioned circuitry or both, and means to feed a record having a plurality of code holes formed therein over said tracker bar thereby to operate said typewriter or said punches or both.

3. In a pneumatically controlled data processing system having a typewriter with appropriate alphanumeric and function keys, said typewriter having an impulse valve associated with each of said keys and comprising part of a circuit including a vacuum supply, said impulse valve being openable to atmosphere upon depression of a typewriter key, said impulse valve having a pair of output ports for connection to atmosphere when said valve is opened by a typewriter key depression, a secondary valve having a control port connected to one of said impulse valve output ports, said secondary valve including an output port connectable to said vacuum supply upon operation of said secondary valve, a bellows connected to said secondary valve output port and operable to be collapsed when said secondary valve is connected to vacuum by an atmospheric pulse transmitted from said impulse valve in response to depression of said key, a punch connected to said bellows for record punching actuation thereby upon collapse thereof for punching a code hole in a record strip, a second secondary valve having an output port and a control port connected to the other of said impulse valve output ports, a second bellows connected to the output port of said second secondary valve and operable to be collapsed when said second secondary valve is connected to vacuum by an atmospheric pulse from said impulse valve, a second punch connected to said second bellows for punching actuation upon collapse thereof for punching another code hole in said record strip thereby to provide with said first mentioned code hole a readable punched code in said strip, and pneumatic means operatively associated with both of said secondary valves for expanding said bellows and retracting said punches after punching actuation thereof, and manually operable means including pneumatic reader circuitry having a record reader tracker bar connectable to said first mentioned circuitry and accordingly to said punches for optionally connecting said reader circuitry to said typewriter or to said first mentioned circuitry or both, and means to feed a record having a plurality of code holes formed therein over said tracker bar thereby to operate said typewriter or said punches or both, and manually operable means to selected desired portions of the punched record for reproduction by said typewriter.

4. Apparatus according to claim 2 including manually operable means pneumatically connected to said reader circuit and operable to stop operation of said record feed means and disable said reader circuitry to permit manual operation of said record feed means, said manually operable means including an impulse valve connected in series to a secondary valve and a bellows to cause operation of said bellows to actuate one of said punches for delete punching of said record.

5. Apparatus according to claim 2 wherein said tracker bar includes a plurality of holes connectable to atmosphere, a primary valve connected to one of said holes and operable to transmit atmospheric pressure from said one hole when uncovered by a punched record, a third secondary valve connected to a vacuum supply and to another of said tracker bar holes and operable to transmit vacuum when operated by passage thereover of another hole in said record, a blocking valve connected to said primary and third secondary valves and operable upon reception of vacuum from said third secondary valve to transmit atmospheric pressure from said primary valve, and pouch actuator means associated with a typewriter key and connected to said blocking valve and responsive to an atmospheric impulse therefrom to activate a typewriter key.

References Cited by the Examiner

UNITED STATES PATENTS

| | | | |
|---|---|---|---|
| 2,351,663 | 6/1944 | Clark | 197—20 |
| 2,377,801 | 6/1945 | Mills et al. | 197—1.6 |
| 2,666,516 | 1/1954 | Boni | 197—11 |
| 2,894,614 | 7/1959 | Lambert et al. | 197—20 |
| 2,932,375 | 4/1960 | Lambert et al. | 197—20 |
| 2,964,108 | 12/1960 | Snyder et al. | 197—1.6 |
| 3,052,336 | 4/1962 | Thomas | 197—1.6 |
| 3,066,859 | 12/1962 | Darwin et al. | 234—107 |

ROBERT E. PULFREY, *Primary Examiner.*

EDGAR S. BURR, *Assistant Examiner.*